United States Patent [19]

Tomita et al.

[11] Patent Number: 5,291,484
[45] Date of Patent: Mar. 1, 1994

[54] RELAY AND EXCHANGE SYSTEM FOR TIME DIVISION MULTIPLEX DATA

[75] Inventors: Yoshihiro Tomita, Tokyo; Tatsuo Fujiwara, Kawasaki; Hirotoshi Shimizu, Kawasaki; Masashi Matsumoto, Kawasaki; Yasushi Fujioka, Kawasaki, all of Japan

[73] Assignee: Fujitsu Limited, Kawasaki, Japan

[21] Appl. No.: 678,327

[22] PCT Filed: Sep. 4, 1990

[86] PCT No.: PCT/JP90/01133

§ 371 Date: May 3, 1991

§ 102(e) Date: May 3, 1991

[87] PCT Pub. No.: WO91/03901

PCT Pub. Date: Mar. 21, 1991

[30] Foreign Application Priority Data

| Sep. 4, 1989 | [JP] | Japan | 1-227433 |
| Sep. 13, 1989 | [JP] | Japan | 1-235705 |
| Oct. 30, 1989 | [JP] | Japan | 1-282798 |
| Nov. 20, 1989 | [JP] | Japan | 1-299792 |
| Dec. 13, 1989 | [JP] | Japan | 1-321345 |
| Dec. 14, 1989 | [JP] | Japan | 1-322763 |

[51] Int. Cl.$^5$ .............................................. H04J 3/12
[52] U.S. Cl. ................................. 370/68.1; 370/110.1; 375/30; 358/438
[58] Field of Search ............... 375/27, 30, 114, 116; 178/2 R, 2 B, 3; 341/51; 370/60.1, 68.1, 110.1, 105.4; 358/425, 434, 438, 261.2, 445; 379/100

[56] References Cited

U.S. PATENT DOCUMENTS

| 3,922,495 | 11/1975 | Donohoe | 370/110.1 |
| 4,430,525 | 2/1984 | Franz et al. | 178/2 B |
| 4,799,217 | 1/1989 | Fang | 370/68.1 |
| 5,144,624 | 9/1992 | Sharper et al. | 370/68.1 |

FOREIGN PATENT DOCUMENTS

| 50-086203 | 7/1975 | Japan . |
| 61-219221 | 9/1986 | Japan . |

Primary Examiner—Benedict V. Safourek
Attorney, Agent, or Firm—Staas & Halsey

[57] ABSTRACT

A relay and exchange system includes a plurality of exchanges for relaying and exchanging transmission information contained in frames each composed of m bits, and are so constructed as to form a tandem connection by a plurality of transmission lines. A pair of multiplexing apparatuses is provided at both ends of each transmission line. On each transmission line, frames each composed of n (n<m) bits for the transmission information and a particular frame composed of both (n−1) bits for the transmission information and one bit containing signaling information in an in-slot form, are transferred. The transferred signal is transformed into an out-slot form signal for the signaling information to be received at each exchange, wherein the particular frame contains information for identifying the signaling, which information indicates a frame phase in which the signaling information is inserted, and according to which information, the signal information is inserted in the particular frame fixedly by always detecting this particular frame between the pair of multiplexing apparatuses and also between the input side and the output side of each exchange, so that quantization noise due to the signaling information is not dispersed over the frames, except for the particular frames.

23 Claims, 21 Drawing Sheets

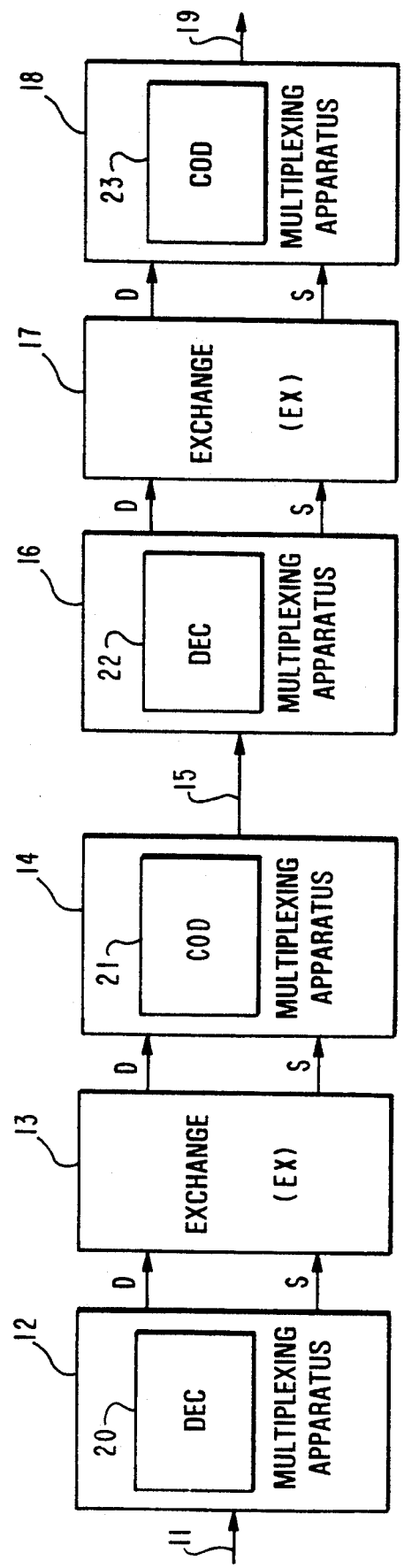
FIG. IA

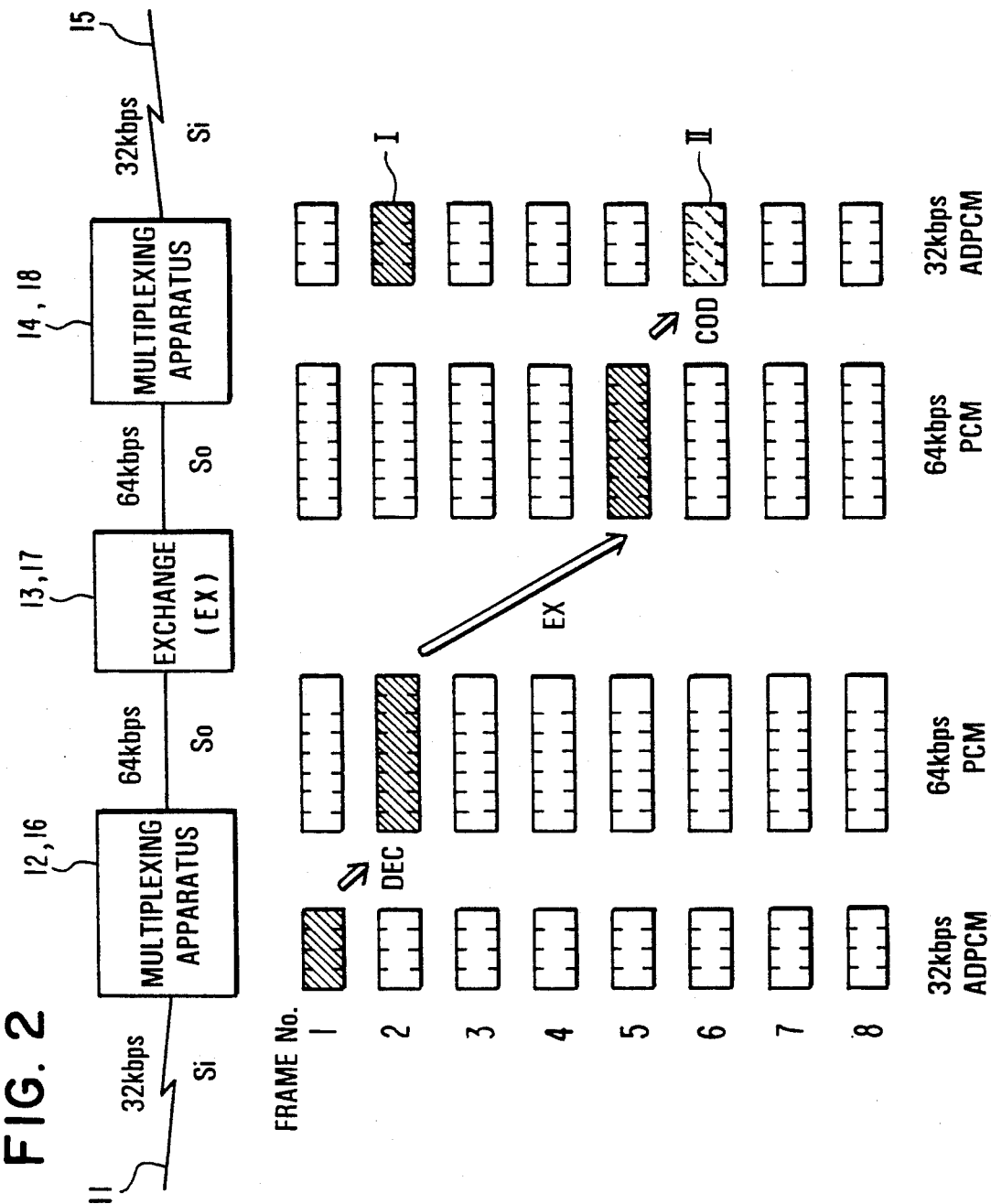

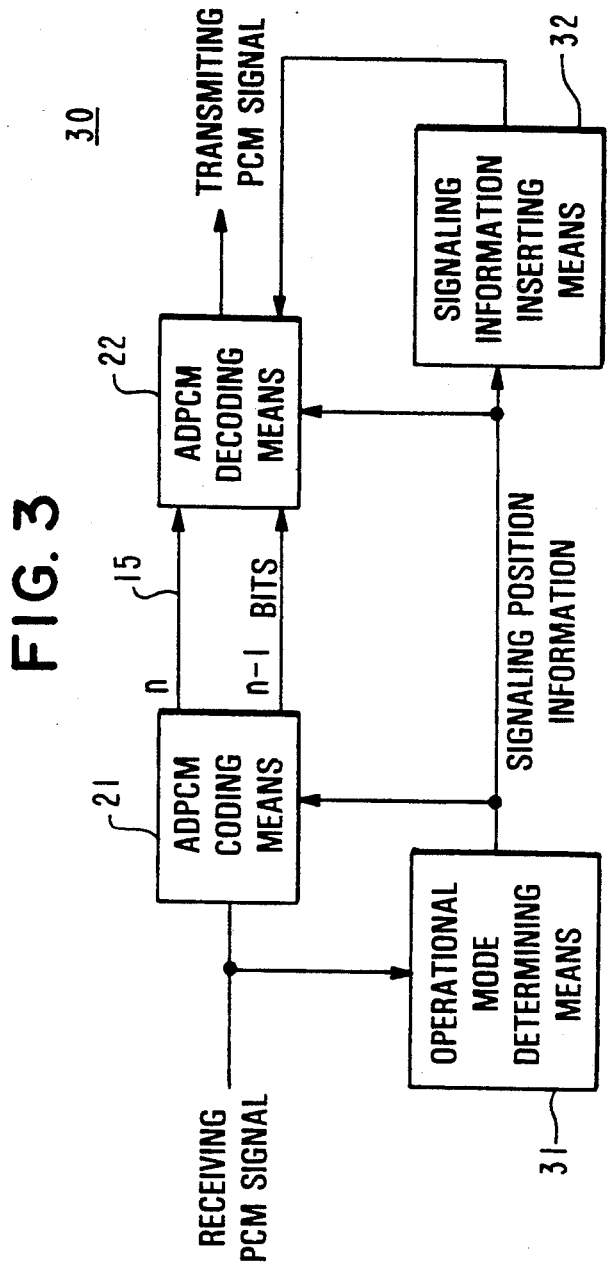

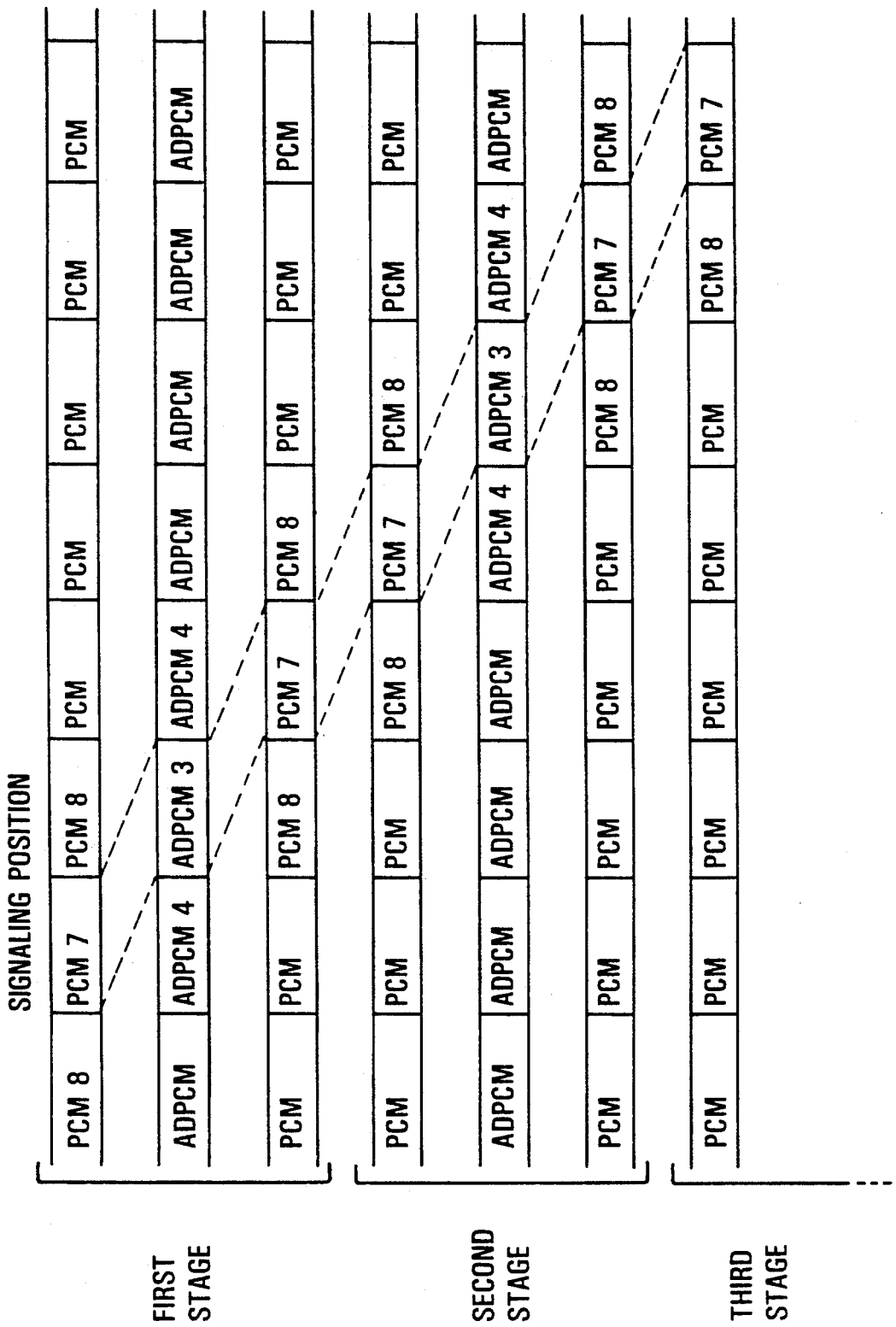

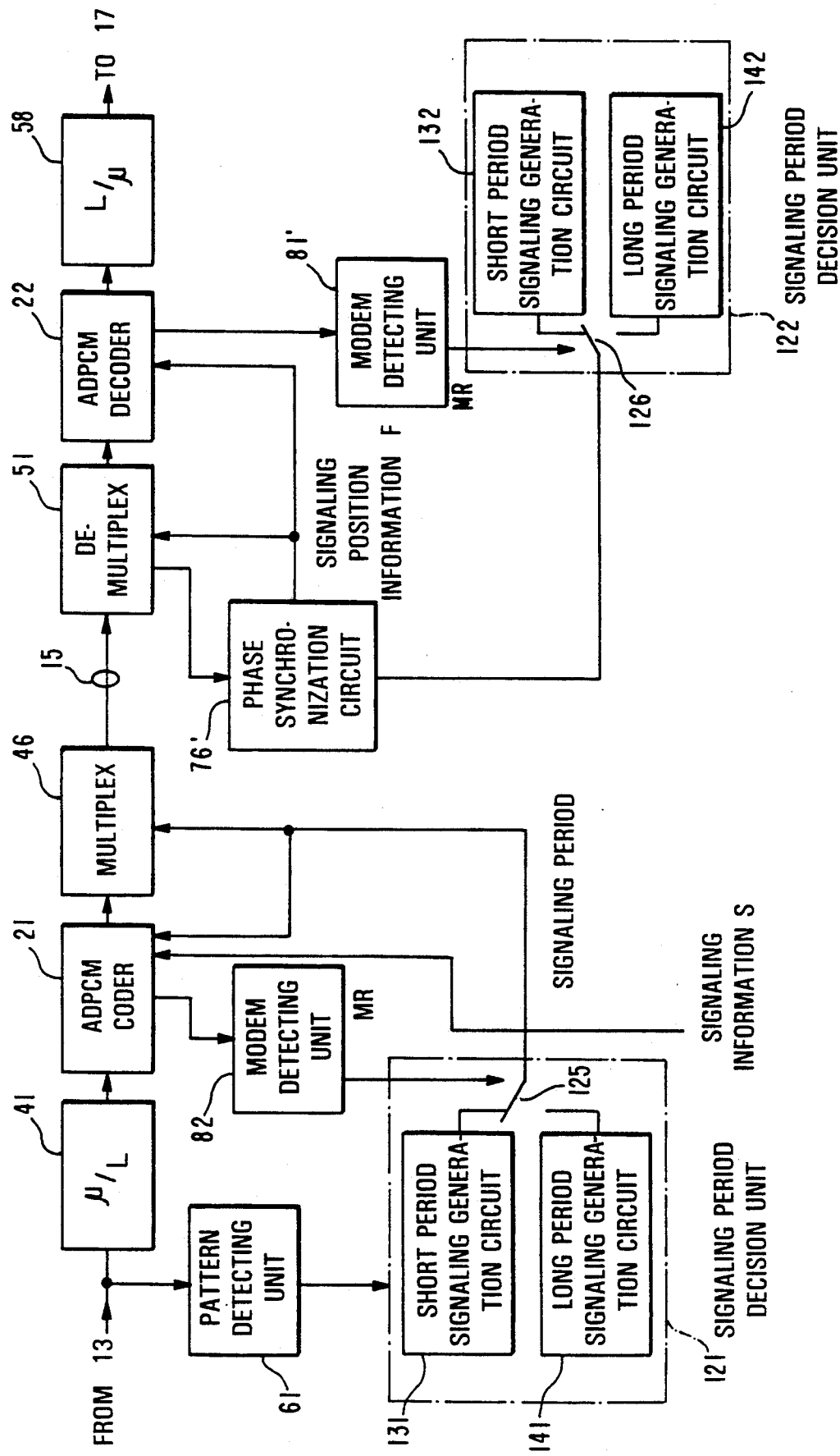

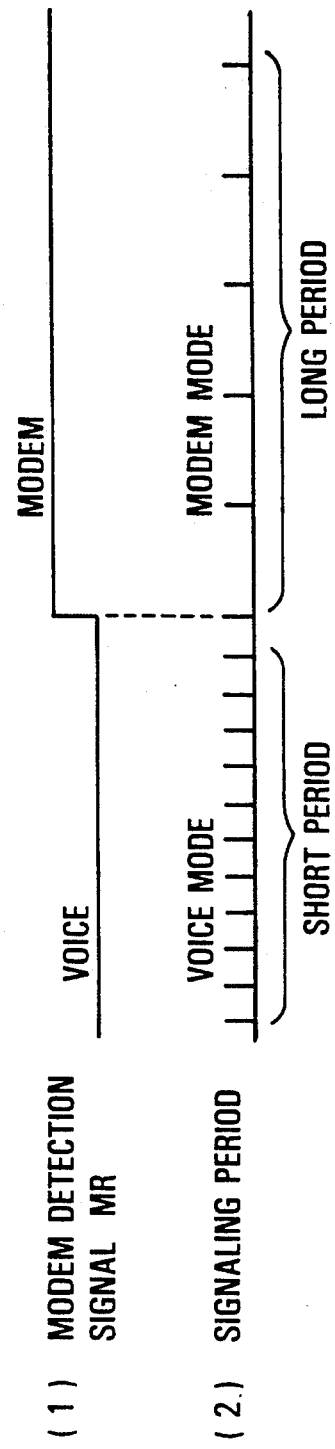

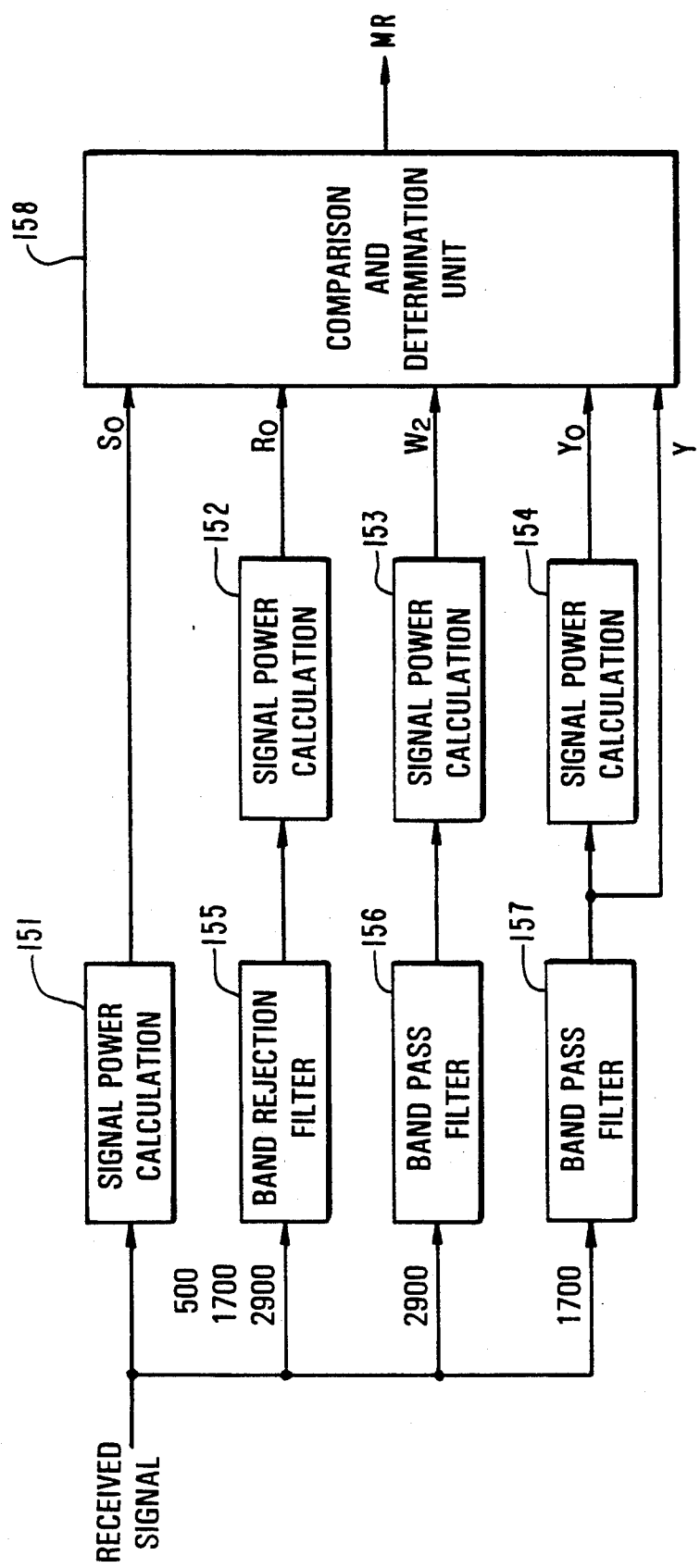

RELAY AND EXCHANGE SYSTEM FOR TIME DIVISION MULTIPLEX DATA

BACKGROUND OF THE INVENTION

1. Field of the Invention

The present invention relates to a system for relaying and exchanging time division multiplex data, and particularly to an exchange system in which a route for achieving an in-slot transmission of signaling information and a route for achieving an out-slot transmission of signaling information are provided alternately, and pairs of transmission information composed of the time division multiplex data and the signaling information provided to control the transmission information for an exchange operation, are relayed to a remote terminal equipment via a plurality of stages of said routes.

2. Description of the Related Art

It is demanded to achieve transmission with high efficiency when transmission information, accompanied by signaling information, is transmitted to a remote terminal equipment through a plurality of stages of exchanges. To satisfy the need for highly, efficient transmission, a digital time division multiplex (TDM) method is widely employed. Particularly, on a transmission line between one exchange and another exchange, an Adaptive Differential Pulse Code Modulation (APCM) coding method of, for example, 32 Kbps, has been tried to achieve a highly efficient transmission of information. In this case, the signaling information is transmitted in such a manner that the signaling information is inserted in a part of a series of time slots which form the transmission information composed of the ADPCM data, which is the aforesaid in-slot transmission. In this case, the signaling information is separated from the time division multiplex data at the input and output sides of the exchange, namely the input and output sides of the time division multiplex data to be transmitted, so the aforesaid out-slot transmission is achieved. The reason for the above is that, since the signaling information contains data for setting up a line, dial data and the like, it is convenient for an exchange handling PCM data of, e.g., 64 Kbps, to separate the signaling information from the time division multiplex data.

In achieving the transmission of the signaling information in the in-slot transmission, it is desired to maintain synchronization between the signaling information appearing at the input and output sides of each exchange for relaying the information. If such synchronization is not maintained, as will be explained in detail hereinafter, the quality of the transmission information is deteriorated. The deterioration in quality is gradually accumulated every time the information is relayed by respective exchanges, whereby the greater the number of the relaying exchanges, the more the quality deteriorates.

SUMMARY OF THE INVENTION

It is an object of the present invention, in view of the above problem, to provide a relay and exchange system for time division multiplex data, in which system, transmission information is transferred together with signaling information in an in-slot form while surely maintaining synchronization of the signaling information when the information is relayed and exchanged, so that voice quality, transmission characteristics of a facsimile (FAX) and the like are not deteriorated even through many stages of exchanges.

To attain the above object, the system of the present invention is operated such that information for identifying the signaling is inserted, at the input side, in a frame corresponding to a particular frame position in the in-slot form multiplex transmission signal, and then sent, and at the output side, the information identifying the signaling is detected to effect signaling synchronization for inserting the signaling information, and the thus processed time division multiplex data is then sent again to a route in the following stage.

In this way, the frame in which the signaling information is inserted, is always specified as one particular frame contained in a multiframe, during the transmission of the TDM data, at any time and at any location along the route. This prevents the frame from being diffused over all of the frames in each multiframe, which frame contains the signaling information which would cause deterioration in voice quality, transmission characteristics of a FAX and the like. Accordingly, the voice quality can always be maintained at a constant level and the transmission characteristics of a FAX are not deteriorated even when the TDM data is relayed and exchanged through many stages of the exchanges.

BRIEF DESCRIPTION

The present invention will be explained below with reference to the accompanying drawings.

FIG. 1 partially illustrates a relay and exchange system for time division multiplex data, which system represents a basis for understanding the present invention;

FIG. 1B illustrates more specifically the construction shown in FIG. 1A;

FIG. 2 schematically depicts a manner for transferring the signaling information during a relay and exchange operation;

FIG. 3 is a view of a principal construction representing a first mode of an embodiment according to the present invention;

Figure 10A:
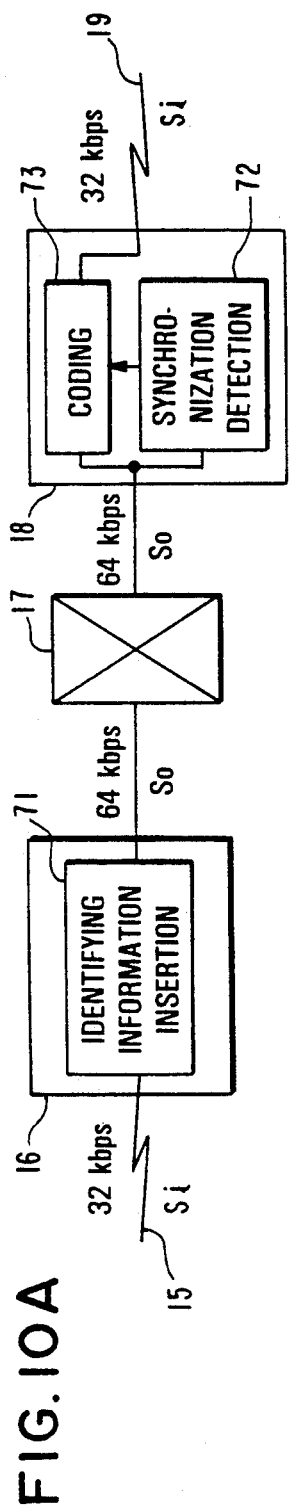
Figure 10B:
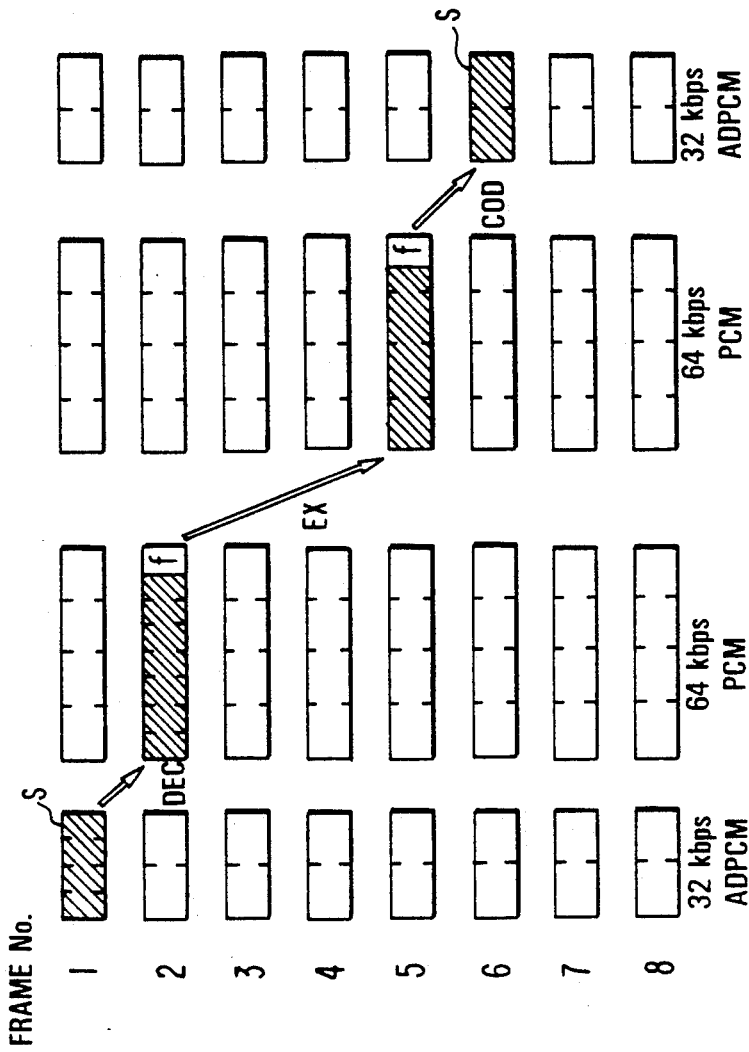
Figure 11:
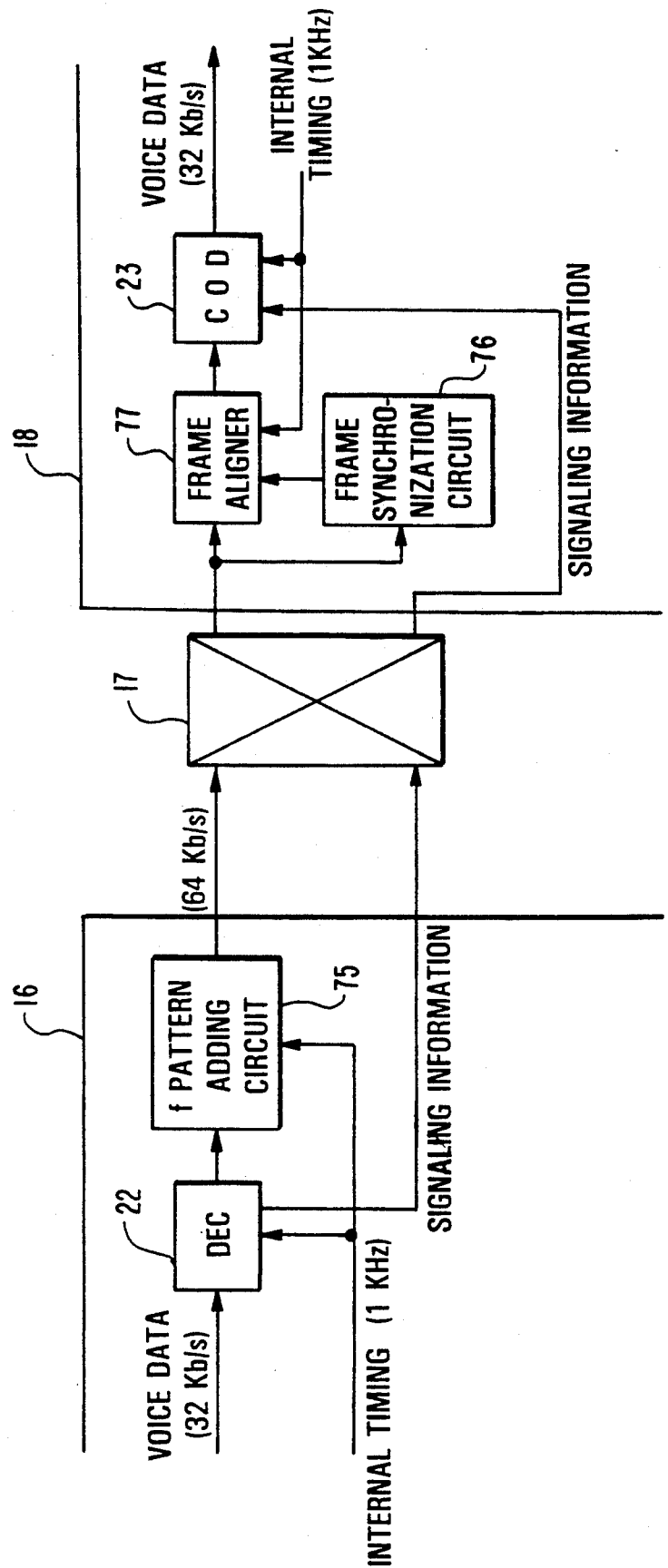
Figure 12:
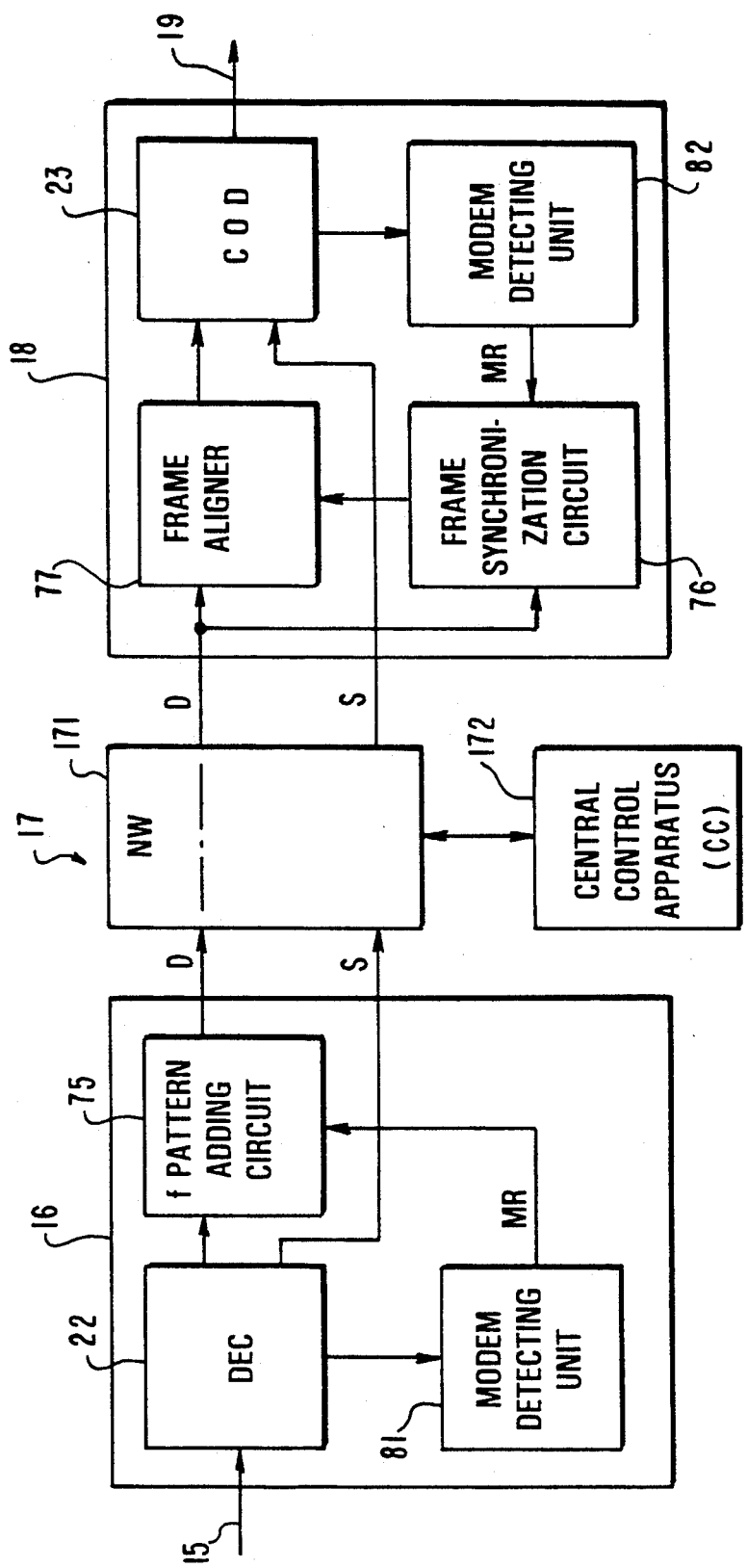
Figure 13:
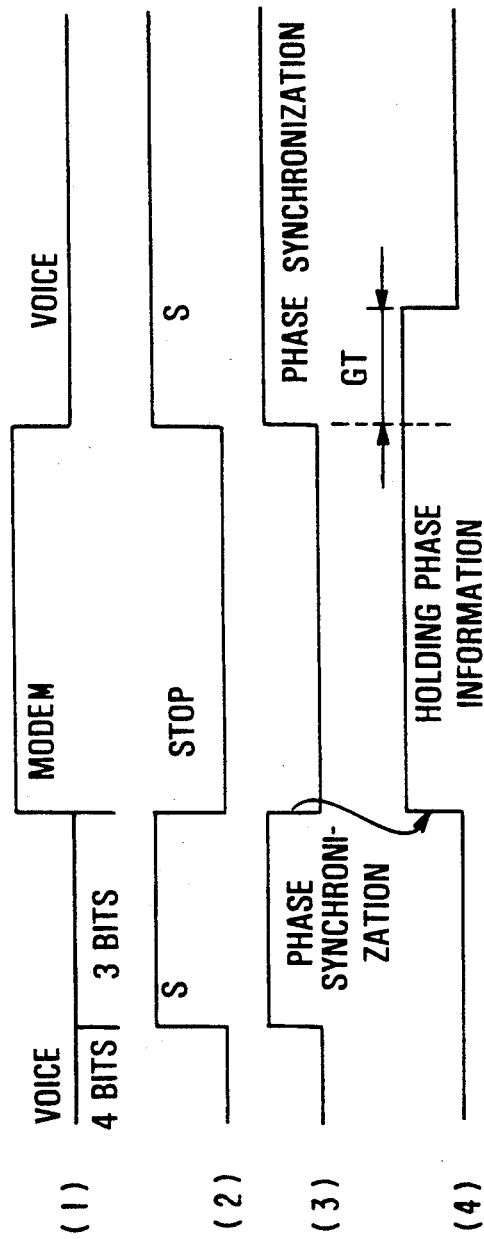
Figure 14:
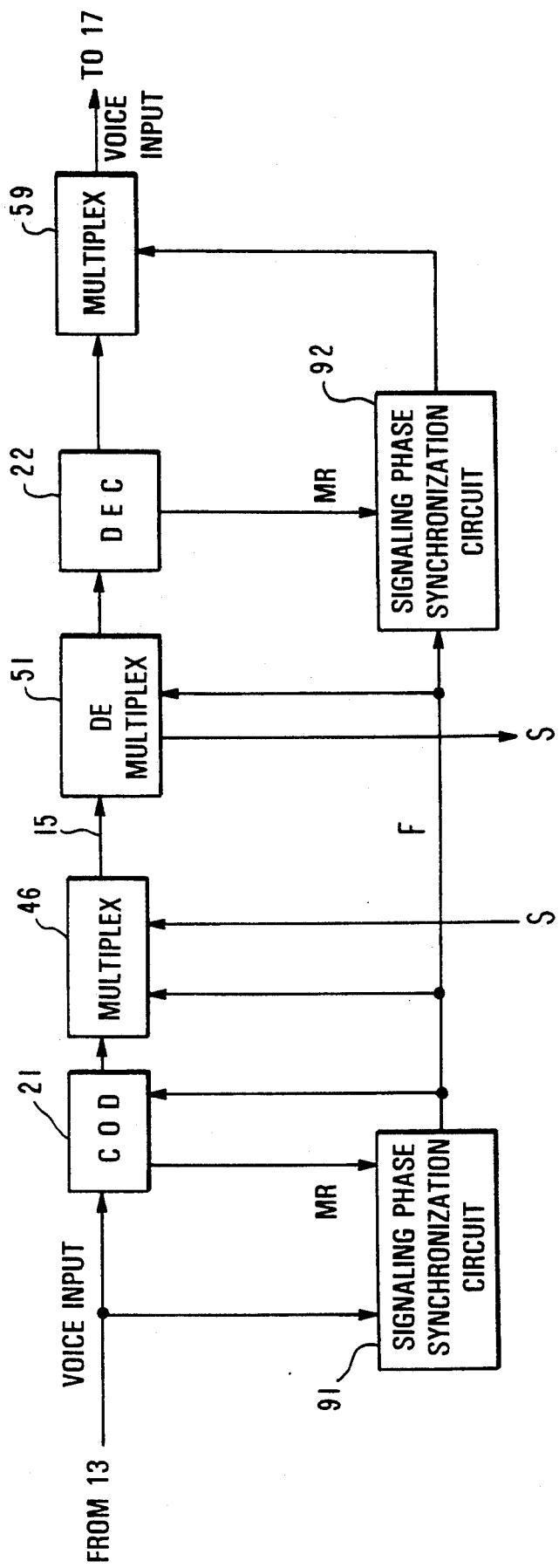
Figure 15:
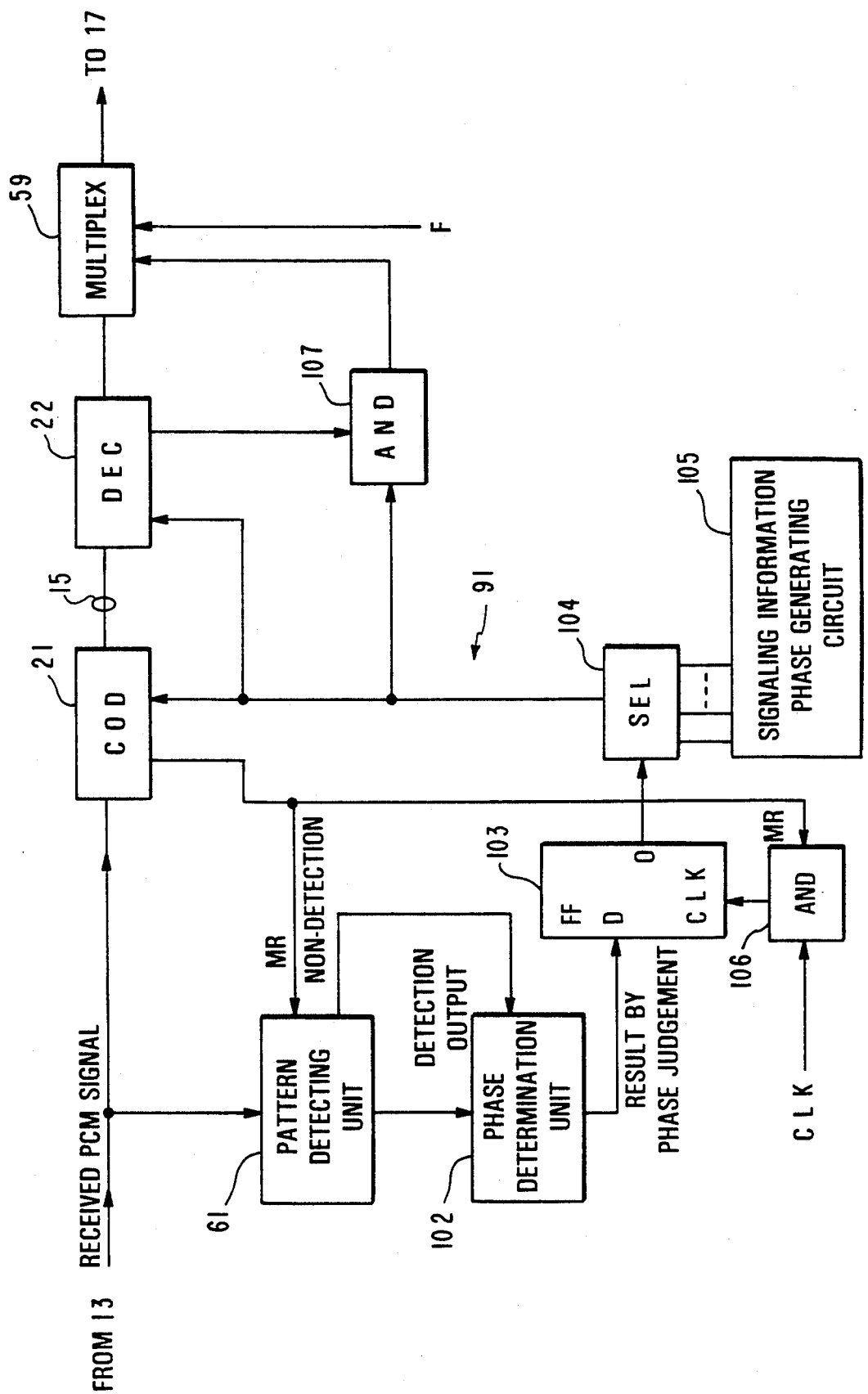
Figure 16:
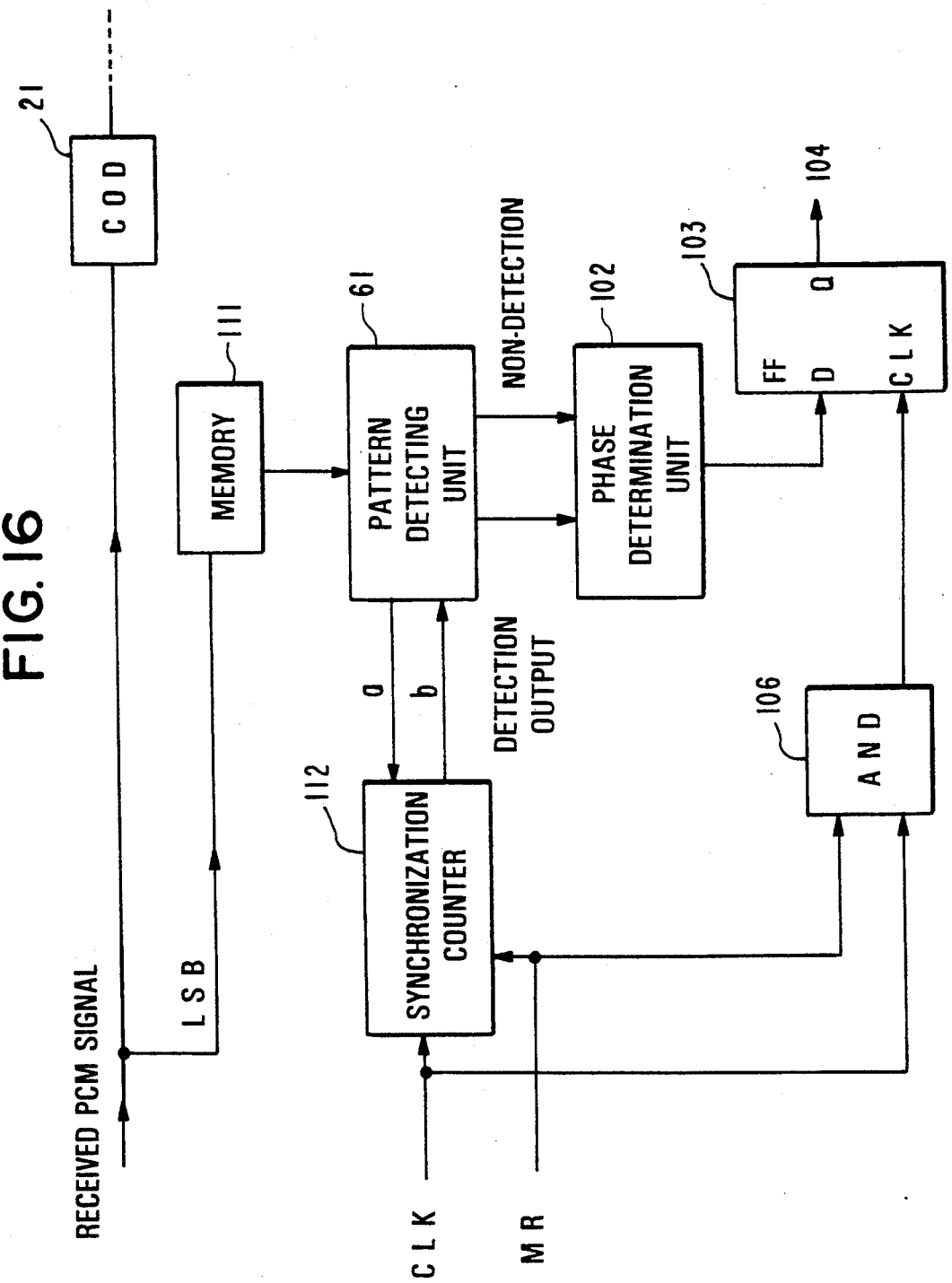
Figure 17:
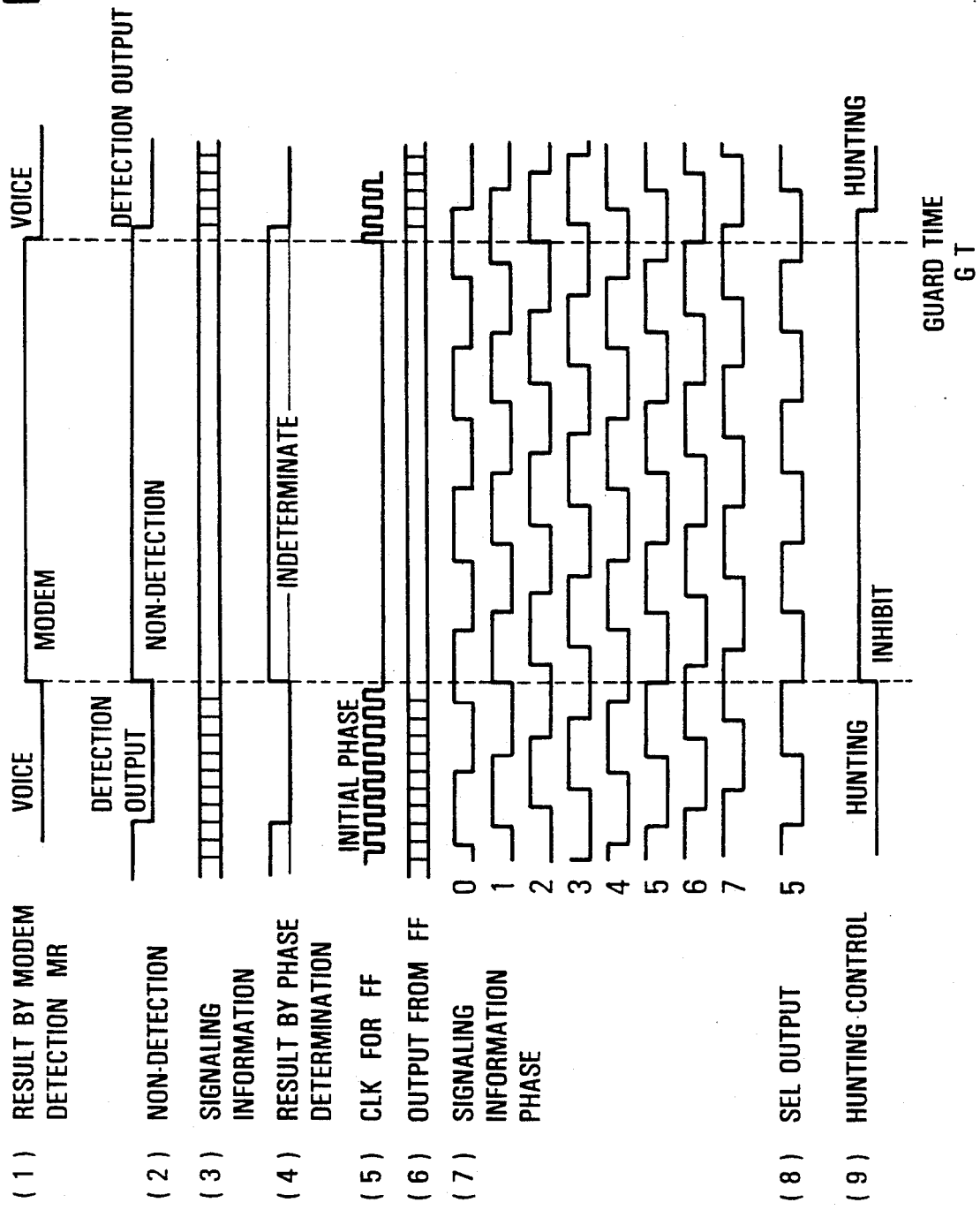
Figure 18:
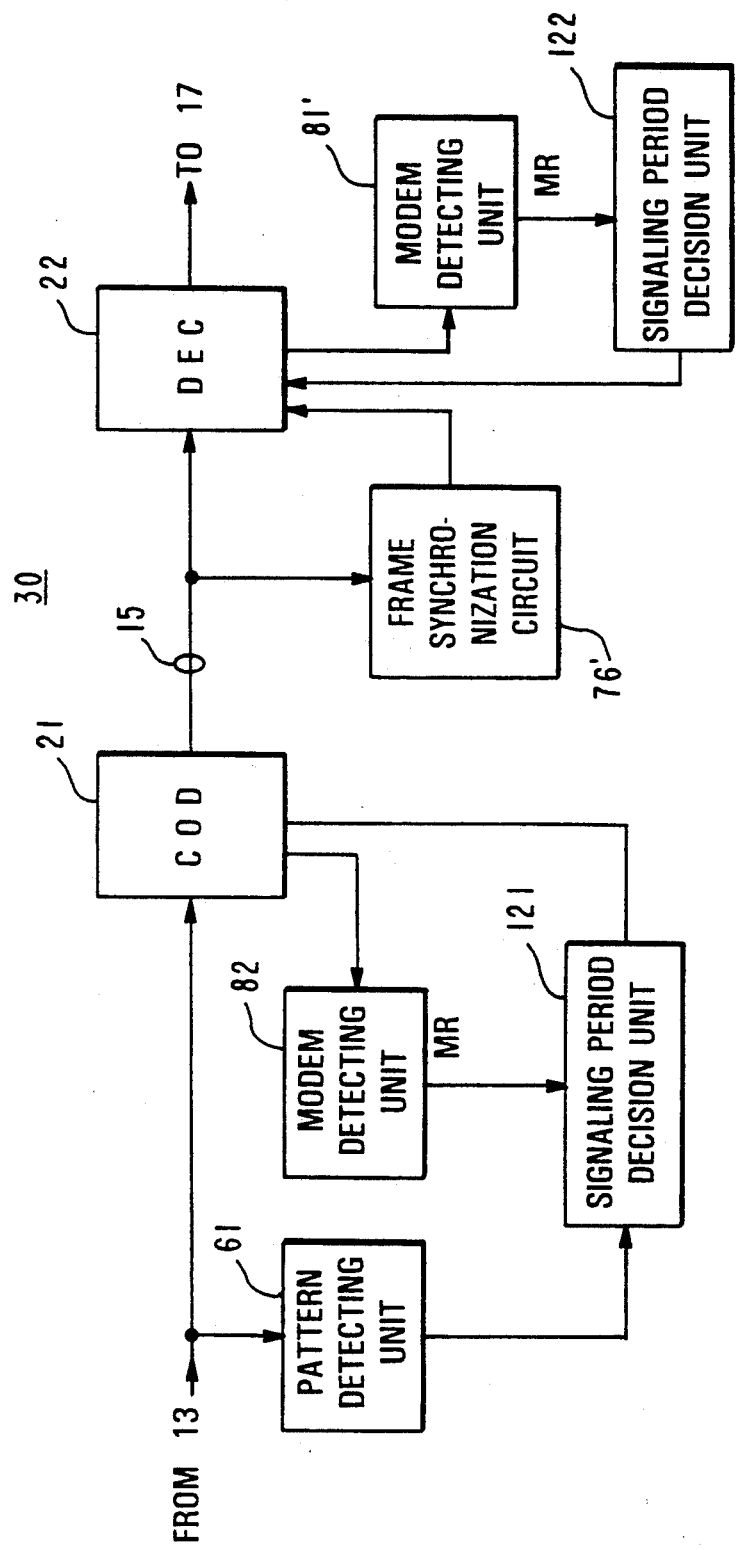

FIG. 9 expresses the number of bits at each stage where coding transmission apparatuses are connected in tandem;

FIG. 10A illustrates a principal construction representing a second mode of an embodiment according to the present invention;

FIG. 10B schematically depicts a manner for transferring the signaling information achieved in the construction of FIG. 10A;

FIG. 11 illustrates more specifically the construction of FIG. 10A;

FIG. 12 illustrates an embodiment of a voice/modem change-over type;

FIG. 13 depicts a timing chart schematically representing a basic operation achieved in the construction of FIG. 12;

FIG. 14 is a view for explaining another embodiment of a voice/modem, change-over type;

FIG. 15 illustrates still another embodiment of a voice/modem change-over type;

FIG. 16 illustrates in more detail the pattern detecting unit of FIG. 15 and also its neighboring members;

FIG. 17 represents, in the form of a timing chart, all operations carried out in the constructions of FIGS. 15 and 16;

FIG. 18 illustrates still another embodiment of a voice/modem change-over type;

FIG. 19 illustrates more specifically the construction of FIG. 18;

FIG. 20 depicts a timing chart representing a change in a signaling period; and

FIG. 21 illustrates an example of a modem detecting unit.

DESCRIPTION OF THE PREFERRED EMBODIMENTS

FIG. 1A partially illustrates a relay and exchange system for time division multiplex data, which system represents a basis for understanding the present invention. Referring to the figure, in a digital transmission network in which a plurality of exchanges (EX) 13 and 17 are connected through transmission lines 11, 15, and 19 by way of multiplexing apparatuses 12, 14, 16, and 18, the signaling information is transmitted, on the transmission lines 11, 15, and 19, in an in-slot form, while the signaling information is transmitted in an out-slot form, in each of the exchanges 13 and 17 and also between the multiplexing apparatuses 12 and 14 corresponding to the exchange 13, and between the multiplexing apparatuses 16 and 18 corresponding to the exchange 17.

Further, on the transmission lines 11, 15, and 19, assuming that the TDM data is coded for band compression at, for example, 32 Kbps and transmitted, while, in the exchanges 13 and 17 and between the multiplexing apparatuses 12 and 14 corresponding to the exchange 13 and also between the multiplexing, apparatuses 16 and 18 corresponding to the exchange 17, the data is handled at, for example, 64 Kbps, each of decoders (DEC) 20 and 22 operates to decode the TDM data of 32 Kbps to the TDM data of 64 Kbps, while each of coders (COD) 21 and 23 operates to code the TDM data of 64 Kbps to the TDM data at 32 Kbps for band compression.

The multiplexing apparatuses 12 and 16 operate to decode the TDM data coded for the band compression and transferred on the transmission lines 11 and 15 by the use of the decoders 20 and 22, respectively, and further the thus decoded signals are separated into the transmission information (data) D and the signaling information S to be input to the exchanges 13 and 17, respectively. These exchanges 13 and 17 operate to exchange respective transmission information (data) D of 64 Kbps according to the signaling information S, and the multiplexing apparatuses 14 and 18 operate to code the transmission information (data) D for band compression by the coders 21 and 23, which information is given from the corresponding exchanges 13 and 17, and at the same time, operate to add the signaling information S given from the exchanges 13 and 17 to transmit the same to the transmission lines 15 and 19, respectively. The use of the term "exchange (EX)" is intended to include a private branch exchange (PBX).

Figure 1B:
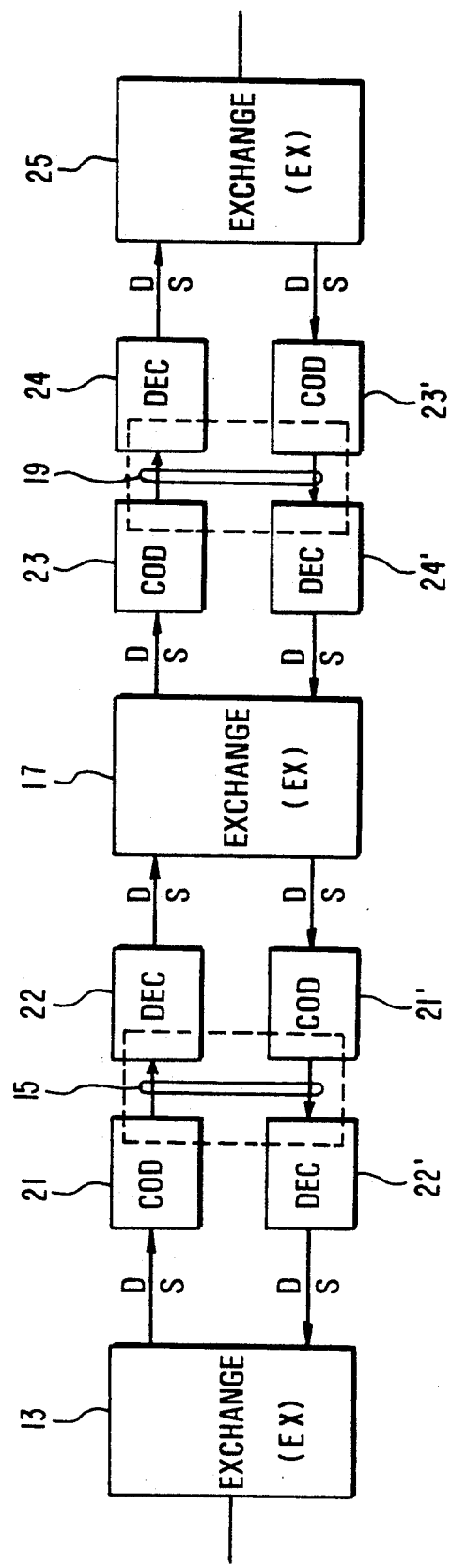

FIG. 1B illustrates more specifically the construction shown in FIG. 1A. It should be noted that members identical to each other are represented by the same reference numerals and symbols (the same applies to later figures). Generally, in a relay and exchange system, a full duplex transmission is performed, and therefore, an upstream route (indicated by, for example, a right oriented arrow) and a downstream route (indicated by, for example, a left oriented arrow) are provided independently from each other. In the figure, the coders (COD) and decoders (DEC) mounted along the downstream route are referenced by numerals 21', 22', 23', and 24'. Incidentally, a coder 23', a decoder 24, and an exchange 25 are illustrated in the figure, which are followed after the transmission line 19, but are not illustrated in FIG. 1A for simplification.

So far, in such a system to achieve transmission of the signaling information, insertion and termination of the signaling information is performed synchronously at each pair of the input side coder and the output side decoder, as shown by broken lines in the figure, and when the signaling information is sent to the next stage, the information is coded and inserted into different frames of the multiframe.

Accordingly, quantizing noise is accumulated gradually every time the coding and the decoding are achieved, which necessarily induces deterioration in signal quality. Namely, the voice quality, the transmission characteristic of a FAX and the like are inevitably deteriorated.

FIG. 2 schematically depicts an operation for transferring the signaling information during a relay and exchange operation, in which the blocks 12, 13, and 14 are selectively extracted from FIG. 1A for purposes of explaining such operation. However, an identical relay and exchange operation also applies to the other blocks 16, 17, and 18 of FIG. 1A.

The top row in FIG. 2 shows the exchange 13 disposed between the transmission lines 11 and 15 and both the multiplexing apparatuses 12 and 14 to be connected to the input side (transmitting side) and output side (receiving side) of the exchange 13. The characters $S_i$ and $S_o$ written therebetween denote the mode of the signaling information. That is, $S_i$ denotes the signaling information in in-slot form and $S_o$ denotes the signaling information in out-slot form.

In a case where the signaling information in in-slot the form is transmitted, the frame in which the signaling information is to be inserted after the relay and exchange operation becomes different from the frame in which the signaling information has been inserted before the related relay and exchange operation at the exchange 13, and thus the signaling information is inserted in a frame at a different time slot. In this case, the frame (including the signaling information) which has been coded with 3 bits at the input side, is coded with 4 bits at the output side. Further, the frame including the signaling information is coded, although coded with 4 bits at the input side, with 3 bits at the output side.

Thus, each frame in which the signaling information is to be included changes every time the frame is relayed and exchanged, so that, the voice quality and the transmission characteristics of a FAX, after the related relay and exchange, deteriorate. This is due to the difference in the number of bits between the 3-bit coding and the 4-bit coding, wherein such coding with different numbers of bits cannot satisfy the condition of a transcoding, and therefore, this causes a deterioration of the voice quality and the transmission characteristics of a FAX. This causes a problem when the deterioration is increasingly accumulated, as mentioned previously, along with an increase in the number of stages for each relay and exchange operation.

Therefore, when the signaling information in in-slot form is relayed and exchanged, it is necessary to correctly perform, at the output side, a synchronization with respect to the signaling information so that deterioration of the voice quality and the transmission characteristics of a FAX can be prevented.

In FIG. 2, ①, ② ... ⑧ denote the number (No.) of a frame, where each one frame is composed of, e.g., 8 bits. Each frame is made into an 8-bit PCM signal by decoding (DEC) a 4-bit coded signal using an ADPCM method, and further, at the exchange, is subject to exchange processing (EX) and, after an elapse of a predetermined delay through the exchange processing, becomes an 8-bit PCM signal switched in a line exchange or a packet exchange, and furthermore, coded (COD) using ADPCM coding to become the original 4-bit coded signal. Note, in the figure, each frame with hatching represents a frame which contributes to transfer of the signaling information, i.e., a frame which causes the aforesaid deterioration of the voice quality and so on. At the right side of the figure, the frame II with broken line hatching represents a frame which contributes to transfer, at the present exchange processing, of the signaling information. While the frame I with hatching represents a frame in which, at its LSB side, signaling information is newly contained for a next stage exchange control.

These frames I and II with hatchings increase in number every time the exchange operation is effected at each exchange, and finally, in the worst case, noise (quantizing error) is diffused over all of the frames in each multiframe.

FIG. 3 is a view of a principal construction representing a first mode of an embodiment according to the present invention. In the first mode embodiment, a coding transmission apparatus 30 has an operational mode determining means 31 and a signaling information inserting means 32. It should be noted that other identical coding transmission apparatuses exist but only one is illustrated here as a representative of such apparatuses.

The coding transmission apparatus is comprised of an ADPCM coding means 21 and an ADPCM decoding means 22 and, in a usual mode, transmits the transmission information such as a voice, in the form of an n-bit ADPCM coded signal and, in a signaling mode, transmits the transmission information such as a voice in the form of an $(n-1)$-bit ADPCM coded signal together with the signaling information bit added thereto at the LSB of the related ADPCM code.

Here, the ADPCM coding means 21 is operative to code a receiving PCM signal into an $n-$ or $(n-1)$-bit ADPCM signal, and the ADPCM decoding means 22 has a function of applying PCM coding to the $n-$ or $(n-1)$-bit ADPCM signal and then transmitting the same.

Further, the operational mode determining means 31 is operative to detect the signaling information S from the receiving PCM signal an make the coding transmission apparatus 30 operative in the signaling mode at the signaling bit position only, otherwise the apparatus 30 is made operative in a usual mode. The signaling information inserting means 32 is operative to insert the signaling information S to be transmitted in the signaling mode to the next stage, into the LSB of the transmitting PCM signal from the ADPCM decoding means 22.

Generally speaking, the first mode of an embodiment according to the present invention operates such that, in a system where a voice signal input of PCM coding with m bits is transmitted as an n $(m>n)$-bit ADPCM coded signal and is then decoded to become m-bit PCM coded again, and then output, and when the signaling information is to be transmitted, the number of bits of the ADPCM coded signal is made $n-1$ and the number of bits of the PCM coding signal is made $m-1$, to carry out the coding and decoding processes.

On the other hand, in an external circuit at the output side of PCM coder (22), predetermined information is superposed onto the lower bit of the PCM signal so as to inform the next stage that the above signal is composed of $n-1$ bits and is ADPCM coded.

In this case, it becomes possible, even when a plurality of coding apparatuses are connected in tandem, for each stage of the apparatuses, to recognize the $n-1$ bits, i.e., the ADPCM coded signal, and accordingly, it becomes possible for the coders 21 at each stage to achieve the ADPCM coding in synchronization with the $(n-1)$-bit signal.

Figure 4:
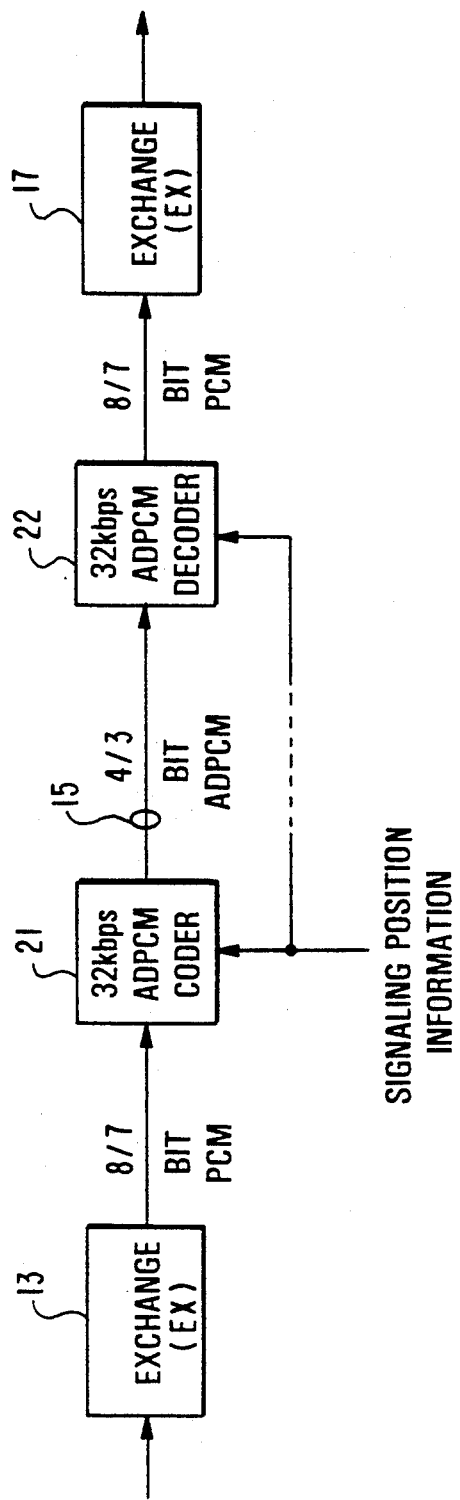
FIG. 4 is a view of the construction shown in FIG. 3 which is redrawn to conform with the construction of FIG. 1B.

FIG. 4 is a view of the construction shown in FIG. 3 which is redrawn to conform with the construction of FIG. 1B. 8-bit or 7-bit time division multiplex PCM data from the exchange 13 is converted, at the ADPCM coder 21 of, e.g., 32 Kbps, into a 4-bit or 3-bit time division multiplex ADPCM signal. The 4-bit or 3-bit ADPCM signal is converted, at the ADPCM decoder 22 of 32 Kbps, into an 8-bit or 7-bit PCM signal, and then applied to the exchange 17.

Figure 5:
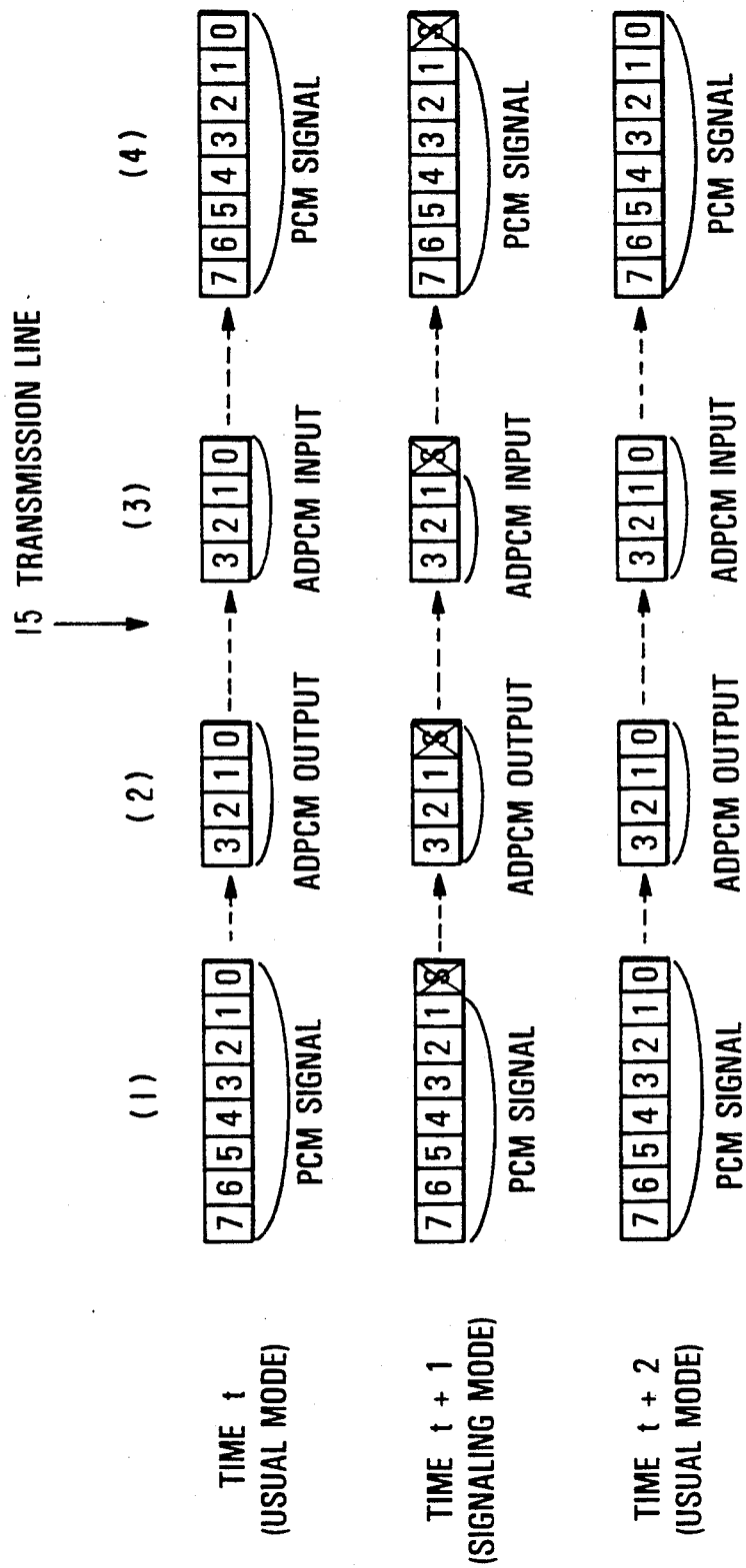
FIG. 5 depicts bit arrangements of the transmission signal in a transmission system of FIG. 4.

FIG. 5 depicts bit arrangements of the transmission signal in the transmission system of FIG. 4. In the figure:

(1) indicates an input signal to the ADPCM coder 21 of 32 Kbps;

(2) indicates an output signal from the ADPCM coder 21 of 32 Kbps;

(3) indicates an input signal to the ADPCM decoder 22 of 32 Kbps; and (4) indicates an output signal from the ADPCM decoder 22 of 32 Kbps.

Assuming here that a usual mode is held at the time t where a voice signal is transmitted from the exchange 13 to the exchange 17, the voice signal is sent as an 8-bit PCM signal from the exchange 13 and is coded, at the ADPCM coder 21 of 32 Kbps, into a 4-bit ADPCM signal and then transmitted. At the ADPCM decoder 22 of 32 Kbps, the thus transmitted signal is processed to be converted into an ADPCM decoding signal with four coding bits while maintaining synchronization with the coder (21) side, and then decoded into an 8-bit PCM signal to be applied to the exchange 17.

On the other hand, at the time $(t+1)$, i.e., in the signaling mode for transmitting the signaling information, the ADPCM coder 21 of 32 Kbps treats its input signal as a 7-bit PCM signal and codes the same into the ADPCM signal with 3 bits, and then the thus coded signal is transmitted. At the ADPCM decoder 22 of 32 Kbps, the thus transmitted signal is processed to be converted into the ADPCM decoding signal with coding bits while maintaining synchronization with the coder 21, and is then decoded into a 7-bit PCM signal to be applied to the exchange 17.

Further, at the time $(t+2)$, i.e., in the usual mode for transmitting a voice signal, the PCM signal changes again to an 8-bit signal and the ADPCM signal changes again to a 4-bit signal.

Thus, when the signaling information is transmitted, the next stage is notified that the ADPCM signal is an ADPCM coded signal with 3 bits, by the bit pattern including the signaling information S contained at the lower bit of the ADPCM signal and also the PCM signal. Due to the presence of signaling position information F, even when the coders 21 and decoders 22 are connected in tandem to form multistages, the ADPCM coding process with 3 bits and the decoding process are performed synchronously at each stage, so that the deterioration of voice quality becomes minimum.

In this case, the signaling information S forms a pattern indicating a signaling position or signaling information which varies in correspondence with the kinds of signals, and it is possible to detect the signaling position information F from either of the two. Note, in FIG. 5, the symbol "X" over the signaling information S means that the bits with an "X" are non-use bits for the coder 21 and the decoder 22.

Figure 6:
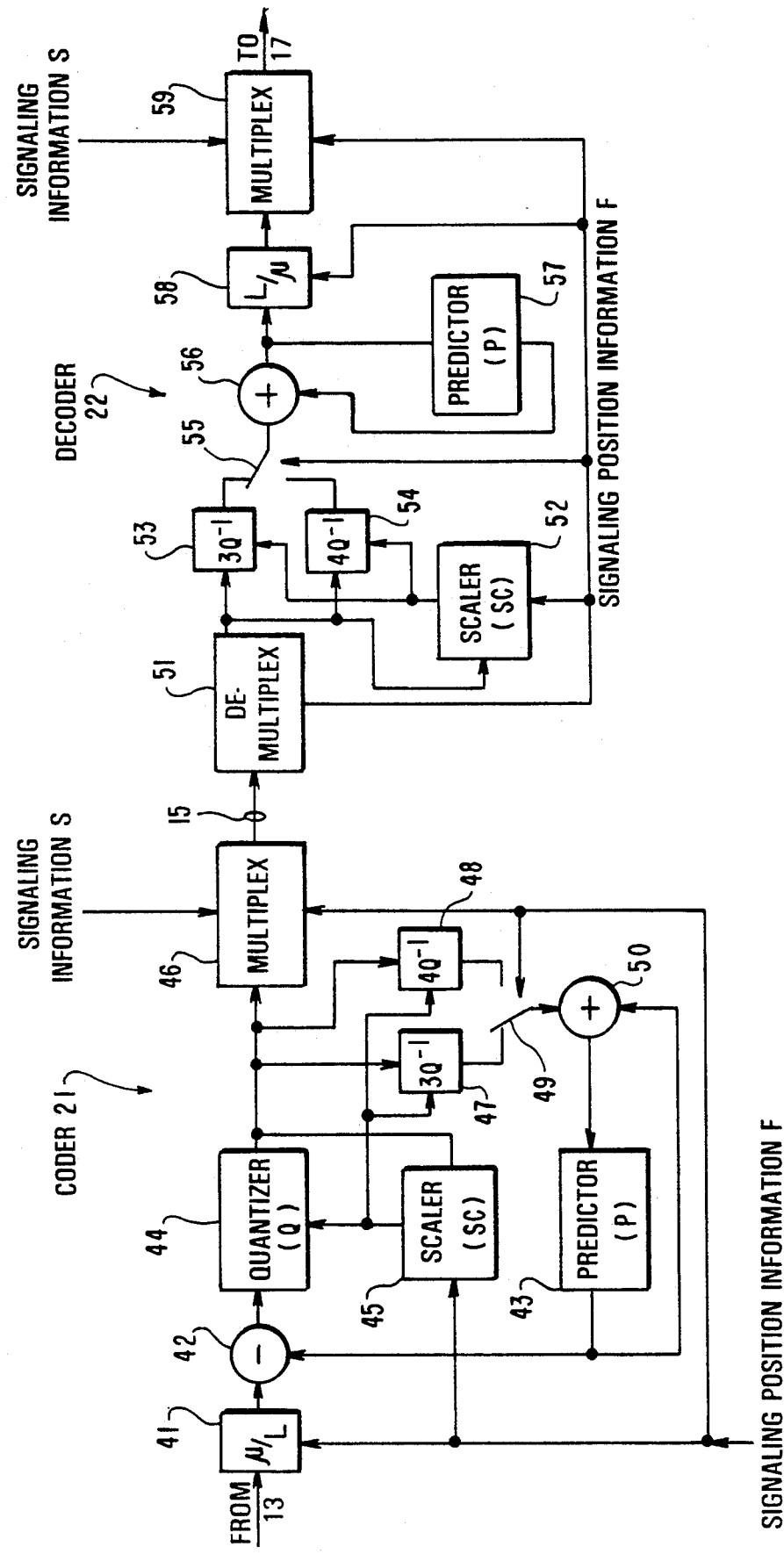
FIG. 6 is a view showing specifically blocks 21 and 22 of FIG. 3.

FIG. 6 is a view showing specifically the blocks 21 and 22 of FIG. 3. At the coder 21 side, reference numeral 41 denotes a code converter ($\mu$/L) for converting from a $\mu$-law PCM code to a linear PCM code, 42 a subtracter, 43 a predictor (P), 44 a quantizer (Q), 45 a scaler (SC) for updating the quantizing step size of the quantizer 44, 46 a multiplexer unit, 47 a reverse quantizer ($3Q^{-1}$) with 3 bits, 48 a reverse quantizer ($4Q^{-1}$) with 4 bits, 49 a switch, and 50 an adder.

Further, at the decoder 22 side, 51 denotes a demultiplexer, 52 a scaler (SC), 53 a reverse quantizer ($3Q^{-1}$) with 3 bits, 54 a reverse quantizer ($4Q^{-1}$) with 4 bits, 55 a switch, 56 an adder, 57 a predictor (P), 58 a code converter (L/$\mu$) for converting from a linear PCM code to a $\mu$-law PCM code, and 59 a multiplexer unit.

At the coder 21 side, the code converter 41 converts a companded PCM signal using the $\mu$-law coding with 8 bits or 7 bits, into a linear PCM signal in accordance with the signaling position information F which is given from a pattern detecting unit (see 61 in FIG. 7) and which is found upon detecting, in terms of a pattern, an input signal. The input PCM signal companded using the $\mu$-law coding is composed of, in a usual mode for transferring a voice signal, 8 bits, while, in a signaling mode for transferring the signaling information S, 7 bits.

The subtracter 42 is operative to perform subtraction of the prediction signal output of the predictor from the output of the code converter 41 so that a prediction error signal is obtained therefrom. The prediction error signal is quantized by the quantizer 44 to output therefrom a quantized prediction error signal.

The scaler 45 is operative, during the above quantizing operation, to update the quantizing step size to be determined by the quantizer 44 in accordance with both the output code from the quantizer 44 and the number of bits used for the quantization. Namely, the scaler 45 updates the quantizing step size, in the usual mode, by using the output code with 4 bits and referring to an update table corresponding to 4 bits, while, in the signaling mode, by using the output code with 3 bits and referring to an update table corresponding to 3 bits.

The multiplexer unit 46 is operative to multiplex the signaling information S with respect to the quantized prediction error signal at the position specified by the signaling position information F and transmit the multiplexed signal, as the ADPCM signal, to the decoder 22 side via the transmission line 15.

On the other hand, the reverse quantizer 47 is operative to reproduce the prediction error signal by reversely quantizing the quantized output from the quantizer 44 with 3 bits, and the reverse quantizer 48 is operative to reproduce the prediction error signal by reversely quantizing the quantized output from the quantizer 44 with 4 bits. The switch 49 is operative to select, in accordance with the signaling position information F, in the signaling mode, the output from the reverse quantizer 47, and to select, in the usual mode, the output from the reverse quantizer 48, and input the selected one to the adder 50. The adder 50 adds the prediction signal to the prediction error signal to produce a reproduction signal. The predictor 43 generates a prediction signal with respect to the above reproduction signal.

At the decoder 22 side, the demultiplexer 51 is operative to separate the signaling position information F by applying pattern detection to the input ADPCM signal and, at the same time, operative to output the quantized prediction error signal. The scaler 52 is operative to update the reverse quantizing step size in each of the reverse quantizers 53 and 54 in accordance with the code of the receiving quantization signal and the number of bits for the quantization. Namely, the scaler 52 updates the quantizing step size by using, in the usual mode, the code of the receiving quantization signal with 4 bits, while using, in the signaling mode, the code of the receiving quantization signal with 3 bits, and also by referring to respective update tables.

The reverse quantizers 53 and 54 reproduce the prediction error signals by reversely quantizing the input signal with 3 bits and 4 bits, respectively. The switch 55 is operative to select, in accordance with the signaling position information F, in the usual mode, the output from the reverse quantizer 54, and to select, in the signaling mode, the output from the reverse quantizer 53.

The adder 56 adds the selected prediction error signal to the prediction signal to produce a reproduction signal. At this time, the predictor 57 generates a prediction signal with respect to the above reproduction signal.

The code converter 58 is operative to convert, in accordance with the signaling position information F, the linear PCM signal into companded PCM signals using the $\mu$-law coding with 8 bits in the usual mode, and with 7 bits in the signaling mode, respectively. The multiplexer unit 59 operates to multiplex the thus converted PCM signal, at the position therein specified by the signaling position information F, with a new signaling information S, and the thus multiplexed signal is output to the next stage.

Figure 7:
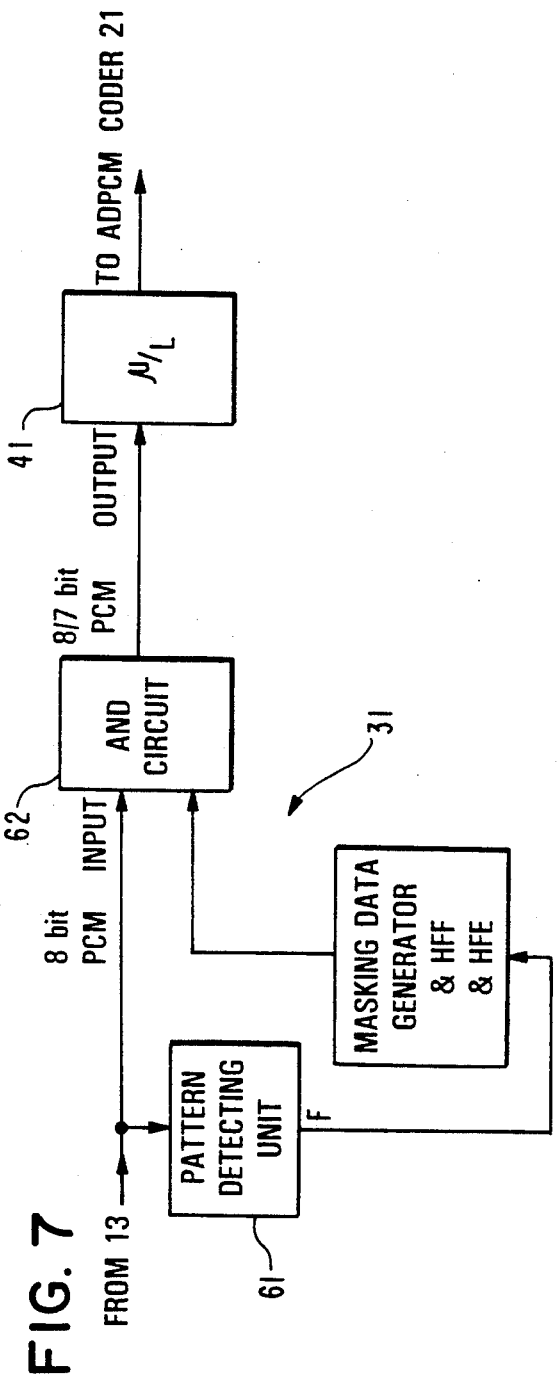
FIG. 7 shows an example of an input side processing unit of a coder.

FIG. 7 shows an example of an input side processing unit of the coder, which corresponds to the operational mode determining means 31 of FIG. 3. In the figure, 61 denotes a pattern detecting unit, 62 denotes an AND circuit, and 41 denotes the aforesaid code converter (L/$\mu$) achieving a conversion from a linear PCM code to a $\mu$-law PCM code.

Figure 8:
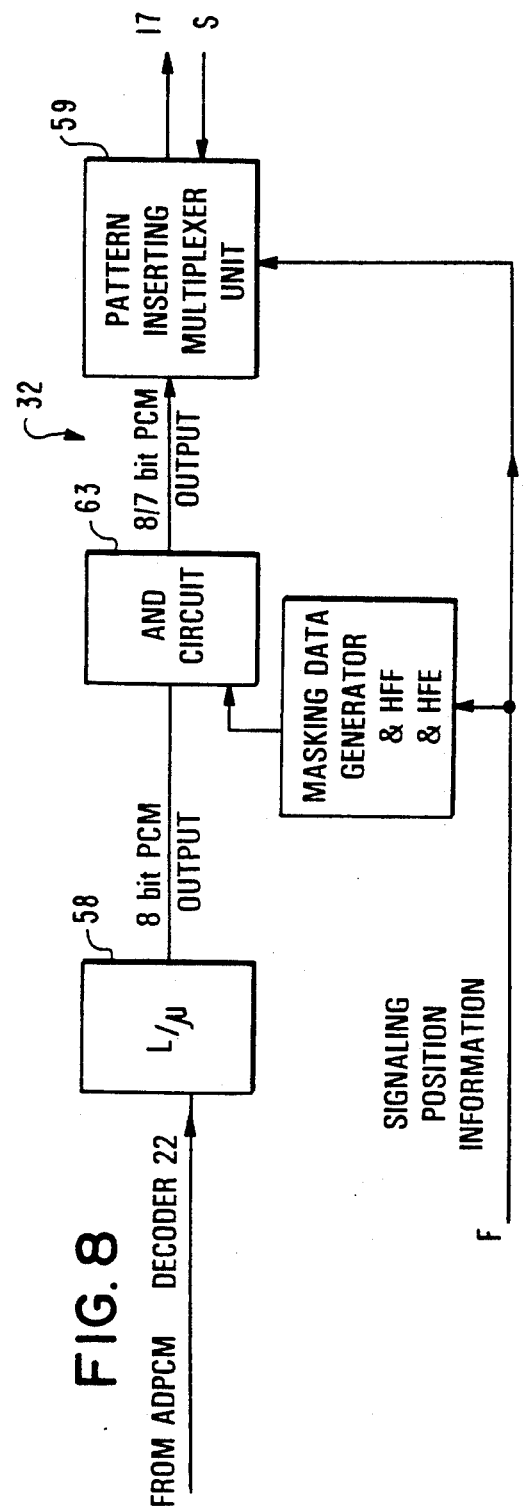
FIG. 8 shows an example of an output side processing unit of a decoder.

FIG. 8 shows an example of an output side processing unit of the decoder, which corresponds to the signaling information inserting means 32 shown in FIG. 3. Reference numeral 58 denotes the aforesaid code converter (L/$\mu$) for converting from a linear PCM code to a $\mu$-law PCM code, 63 denotes an AND circuit, and 59 denotes the aforesaid multiplexer unit, particularly, a pattern inserting multiplexer unit.

In FIG. 7, i.e., the coder 21 side, the pattern detecting unit 61 is operative to detect the signaling position information F by pattern detection with respect to the $\mu$-law PCM signal input of 8 bits, and generates, in the usual mode, masking data &HFF of 8 bits, while, L in the signaling mode, masking data &HFE of 7 bits. The AND circuit 62 carries out an AND operation with respect to both the input signal and the above masking data to produce, in the usual mode, a PCM signal of 8 bits, while, in the signaling mode, a PCM signal of 7 bits. The signal is converted by the code converter 41 to a linear PCM signal which is then input to the ADPCM coder 21.

In this case, in the signaling mode, the least significant bit of the above signal is fixed at logic "0" due to the above AND operation with the masking data.

The masking data &HFF is, for example, a 8-bit data of all "1", i.e.,

"11111111"

and the masking data &HFE is, for example, 8-bit data having, at its least significant bit, "0", i.e.,

"11111110"

It should be understood here that an OR circuit may be used instead of the AND circuit, and further, for the masking data, masking data &H00 for 8 bits may be used in the usual mode, while masking data &H01 for 7 bits may be used in the signaling mode, wherein the least significant bit is fixed at logic "1".

In FIG. 8, i.e., the decoder 22 side, the aforesaid code converter 58 converts the linear PCM signal from the ADPCM decoder 22 to a μ-law PCM signal of 8 bits. And either the masking data &HFF of 8 bits, when in the usual mode, or the masking data &HFE of 7 bits, when in the signaling mode, is generated in accordance with the signaling position information F, and then applied to the AND circuit 63 at which an AND operation is carried out with respect to the μ-law PCM signal of 8 bits from the code converter 58 to produce, if in the usual mode, a PCM signal of 8 bits or, if in the signaling mode, a PCM signal of 7 bits having its least significant bit fixed at logic "0".

The pattern inserting multiplexer unit 59 multiplexes, if the PCM signal is 7 bits, a pattern of new signaling information S by inserting the same at the position specified by the signaling position information F.

In this case too, the least significant bit of the 7-bit PCM signal may be made logic "1", instead of "0", by employing an OR circuit, and further employing data &H00, in the usual mode, as the masking data for 8 bits or data &H01, in the signaling mode, as the masking data for 7 bits.

In this way, at the input and output of the code converter, the signaling information contained in the PCM signal is fixed at logic "0" or "1", and thus, noise generated by the signaling information during the code conversion can be suppressed.

FIG. 9 expresses the number of bits at each stage where coding transmission apparatuses are connected in tandem. In the figure, a case where the number of connected stages is three, is used for brevity.

The input signal at the first stage is converted into a PCM signal of 8 bits since the input signal has nothing to do with the signaling information, and the coded signal is applied to the ADPCM coder at the first stage via the exchange. Then, an ADPCM coding processing is achieved with 4 bits if in the usual mode, while the ADPCM coding processing is achieved with 3 bits if in the signaling mode in accordance with the signaling position information.

On the other hand, in the corresponding ADPCM decoder, according to the signaling position information sent with the ADPCM signal, a decoding processing is achieved with 3 bits if in the signaling mode, or with 4 bits if in the usual mode. The thus decoded signal is converted from a linear PCM signal to a μ-law (or A-law) PCM signal and then transmitted to the next stage. At the next stage, as in the first stage, the coding and decoding processes are achieved with respect to the input signal with the number of bits determining whether or not the signaling position information exists.

In this case, so far, the signaling position information is terminated at each stage, however, in the present invention, the decoded signal is first converted into a μ-law PCM signal and next the μ-law signal is multiplexed with the signaling position information given to the decoder, by inserting same at the LSB of the μ-law PCM signal, and the thus multiplexed signal is transmitted to the following stage.

At the next stage, the LSB of the input signal is always monitored to detect the phase of the signal when the pattern indicating the signaling position information is received. The thus detected phase of signal is considered as a time slot to perform the coding with 3 bits so as to transmit the signaling information, so that the ADPCM coding is achieved with 3 bits and, at the same time, signaling information for the next stage is multiplexed at the related signal phase and transmitted thereto.

In this case, since the signaling position information is multiplexed at the LSB of the input PCM signal, if the signal, as it is, is converted into a linear PCM signal or a μ-law PCM signal, the noise increases. To prevent this, before or after the conversion, the LSB is fixedly set at logic "0" or "1", whereby the effect caused by noise can be minimized.

Even when the aforementioned processing is executed successively through each of the stages connected in tandem, the time slot of the PCM signal to which the ADPCM coding with 3 bits is applied, is fixed to a particular time slot at all times. Therefore, the deterioration in characteristic due to the multistage connection can be relieved by a synchronous tandem coding algorithm included in an ADPCM coding method, so that the deterioration in characteristic can be minimized.

Note, if the signaling is not used at the preceding stage, and therefore, no pattern indicating the signaling position information is contained in the transmission signal, the position of a pattern indicating the signaling position information is indefinite at the stage where the signaling information is to be inserted. In such a case, the position for the signaling position information may be defined, as a default value, by a reference position which is predetermined for each stage.

The above explanation was made assuming a case where the PCM coding is performed with 8 bits or 7 bits and the ADPCM coding is performed with 4 bits or 3 bits, however, the present invention is not limited to such a case, but can be adopted to a case where the PCM coding is performed with an arbitrary number of m or (m−1) bits for the PCM coding, and an arbitrary number of n or (n−1) bits for the ADPCM coding.

FIG. 10A illustrates a principal construction representing a second mode of an embodiment according to the present invention, and FIG. 10B schematically depicts a manner for transferring the signaling information achieved in the construction of FIG. 10A. It should be understood that FIGS. 10A and 10B correspond to the previous FIG. 2 used for explaining the conventional art. Therefore, FIG. 10B should be viewed similarly to FIG. 2.

A signaling in-slot transmission synchronization method according to the second mode of an embodiment of the present invention is operated as follows. In a digital transmission network wherein, at a transmission side (input side), a transmission signal of an in-slot form, which is coded by inserting signaling information in a particular frame in a multiframe, is decoded to a relay and exchange transmission signal suitable for the relay and exchange operation and then relayed and exchanged, and at a receiving side (output side), the signal is coded to become a transmission signal in the in-slot form again. At the input side, an identifying information inserting means 71 is mounted and, at the output side, both a synchronization detecting means 72 and a coding means 73 are mounted, wherein the means 71 is operative to insert identifying information f in a frame composing the relay and exchange transmission signal, which frame position corresponds to a particular frame position in the transmission signal of the in-slot form, and to transmit said transmission signal to the relay and exchange network. The means 72 is operative to detect the frame from the received relay and exchange transmission signal in which frame the identifying information f is inserted, and the means 73 is operative to insert signaling information by establishing synchronization with the thus detected frame for coding into a transmission signal of an in-slot form again.

The multiplexing apparatus 16 at the input side inserts the identifying information f, by means of the identifying information inserting means 71, in one of the frames composing the relay and exchange transmission signal, which frame corresponds to the frame in which the signaling information has been contained, and then the apparatus 16 applies the signal to the multiplexing apparatus 18 located at a remote office side via the relaying exchanges 17.

The multiplexing apparatus 18 detects, by means of the synchronization detecting means 72, the identifying information f so as to detect the phase of a signal in which signaling information is to be inserted. Further, based on the thus detected signal phase and by means of the coding means 73, an insertion of the signaling information is performed by coding such that the signaling information is inserted in the specified frame.

FIG. 11 illustrates more specifically the construction of FIG. 10A. In the figure, 16 denotes the input side multiplexing apparatus, 18 denotes the output side multiplexing apparatus, and 17 denotes the exchange as a relaying exchange, for example, a private branch exchange. The exchange carries out, as mentioned before, an exchange processing with 64 Kbps as a unit and also transmits signaling information in the in-slot form.

A transmitting unit of the multiplexing apparatus 16 is comprised of members including the ADPCM decoder 22 of 32 Kbps and an f pattern adding circuit 75 for adding an f pattern which is used for identifying the signaling information. The decoder 22 converts a voice signal of 32 Kbps, a FAX signal and so on, into PCM signals of 64 Kbps and also has a function of separating the signaling information from a multiframe containing the same.

The f pattern adding circuit 75 operates to insert a frame pattern (f pattern) into a frame of the multiframe converted from 32 Kbps to 64 Kbps, and in which the signaling information has been inserted before the related conversion. The frame pattern is inserted in the LSB of the PCM signal (composed of 8 bits per each frame) of 64 Kbps, which frame pattern is, e.g., an alternating bit pattern of logic "1" and logic "0".

A receiving unit of the output side multiplexing apparatus 18 is comprised of members including a frame synchronization circuit 76, a frame aligner circuit 77 and the ADPCM coder 23 of 32 Kbps. The frame synchronization circuit 76 operates to detect the f pattern composed of alternating "1" and "0" bits inserted in the received multiframe signal so as to establish synchronization. The frame aligner circuit 77 operates to match the multiframe phase, based on the synchronization of alternating "1" and "0" bits by the frame synchronization circuit 76, with the internal timing defined inside the apparatus (18). Further the coder 23 operates to insert the signaling information transmitted in the out-slot form into the PCM signal of 64 Kbs handled in the exchange, and to code the same again to produce an ADPCM signal of 32 Kbps.

The multiplexing apparatus 16 is input with a transmission signal in signaling in-slot form at 32 Kbps. Namely, the transmission signal is composed of a multiframe which is composed of 8 frames each composed of 4 bits. In one of the frames (illustrated with hatchings in FIG. 10B), the signaling information is inserted at its LSB.

In the multiplexing apparatus 16, the ADPCM signal of 32 Kbs is decoded into the ADPCM signal of 64 Kbps by the decoder 22 and then the signaling information is separated from the related frame containing the same. Further, the f pattern adding circuit 75 inserts the f pattern of alternating "1" and "0" bits into the frame, at its LSB, which corresponds to the frame, in the converted multiframe of 64 Kbps, which contained the signaling information before the conversion to 64 Kbps, and thereafter, the signal having the said f pattern inserted therein is input to the exchange 17 side. The signaling information separated at the decoder 22 is transmitted in the out-slot form to the remote multiplexing apparatus 18 via the exchange 17.

In the multiplexing apparatus 18, the f pattern is detected from the PCM signal of 64 Kbps which was received after the relay and exchange operation, and then, the multiframe phase is matched by the frame aligner circuit 77 with the frame phase defined in the 3-bit coding achieved by the coder 23.

As a result, the coder 23 inserts the signaling information which was relayed and exchanged in the out-slot form into the frame which contained the f pattern, i.e., the frame which contained at the input side the signaling information, and the thus obtained frame is coded with 3 bits. Each of the remaining frames in the multiframe is coded with 4 bits.

In this way, the frame coded with 3 bits at the input side is also coded with 3 bits at the output side, and thereby, the deterioration of the voice quality and the transmission characteristics of a FAX, due to the difference in the coding algorithm between the 3-bit coding and the 4-bit coding, can be prevented.

It should be noted that, when a call originates from within the exchange 17, the multiplexing apparatus 18 receives, as an input, a PCM signal of 64 Kbps including no f pattern of alternating "1" and "0" bits, as opposed to other exchanges which relay and exchange a call. This being so, the frame synchronization circuit 76 cannot establish synchronization, however, there is no problem in transferring the PCM signal by causing the frame aligner circuit 77 to operate as a fixed delay circuit.

The cycle for inserting the aforesaid identifying information f (f pattern) can be determined to have a one to one correspondence with the insertion cycle of the aforesaid signaling position information F (F pattern). Alternatively, the insertion cycle of the f pattern may be whole multiples of the isertion cycle of the F pattern.

An ADPCM coding algorithm is recommended by the CCITT (CCITT G. 721), as a high efficiency coding method with respect to a voice, for realizing a good voice transmission even at the bit rate of 32 Kbps.

However, a considerable difference in nature exists between a voice signal and a modem signal (FAX signal). Due to this, if the algorithm recommended above is employed, it is impossible to transmit a modem signal of 9600 bps for a FAX signal based on a standard of GIII which is the most widely available at present.

To solve the above problem, a change-over coding method has been proposed, in which, through a detection of the modem signal of 9600 bps, if a voice signal is given, the algorithm based on the CCITT G. 721 is used for transferring the same, and if a modem signal is given, an algorithm used exclusively for the modem is employed to transmit the same.

It is more practical in adopting the present invention to construct an exchange system in which the change-over coding method, according to the above proposal, is further incorporated. Means for realizing the above will be explained below with reference to several examples.

FIG. 12 illustrates an embodiment of a voice/modem change-over type, particularly the embodiment is based on the construction of FIG. 11 to which the aforesaid change-over coding method is adopted. In FIG. 12, newly employed elements are a modem detecting unit 81 at the input side (decoder 22 side) and a modem detecting unit 82 at the output side (coder 23 side). Namely, in the multiplexing apparatuses 16 and 18, the modem detecting units 81 and 82 are mounted, respectively, for discriminating whether a voice signal or a modem signal (FAX signal) is given, and by the modem detecting units 81 and 82, if it is detected that the transmission information is a modem signal, the multiplexing apparatus 16 operates to stop the insertion of an f pattern at the f pattern adding circuit 15, and in the multiplexing apparatus operates to stop the detection of the f pattern at the frame synchronization circuit 76 and fix the synchronization phase.

FIG. 13 depicts a timing chart schematically representing a basic operation achieved in the construction of FIG. 12. Row (1) of FIG. 13 represents a pattern in which a voice signal transmission mode is changed to a modem signal transmission mode and then returns to the voice signal transmission mode again. In the voice signal transmission mode, if the signaling information S exists, the signaling information is added to the voice signal coded with 3 bits, and then transmitted. In the same circumstances, if the signaling information does not exist, the voice signal is coded with 4 bits.

Row (2) of FIG. 13 represents the case where, when the voice signal transmission mode is changed to the modem signal transmission mode, the transmission of the signaling information S is stopped, and if the mode returns to the voice signal transmission mode again, the transmission of the signaling information S is restarted.

Row (3) of FIG. 13 represents the case where, if the signaling information S exists, a phase synchronization for the information S is performed.

Row (4) of FIG. 13 represents the case where, when the operation of the phase synchronization depicted in row (3) is stopped, the phase information of the information S, which phase information has already been established, is still held as it is. Further, by using the held phase information, the phase synchronization in the restarted voice signal transmission mode is maintained, while establishing a new phase synchronization in the above voice signal transmission mode. In this case, it is preferable to utilize a guard time GT which is equal to or a little shorter than a pull-in time in which the above phase synchronization is completed, which pull-in time is determined according to a method for carrying out the pull-in of the phase synchronization. During at least the guard time GT, the aforesaid phase information is held. The guard time GT will be explained in detail hereinafter. Returning to FIG. 12 again, a further detailed explanation will be given below.

In the multiplexing apparatus 16 connected to the input side (transmission side) of the exchange 17, the f pattern is inserted by the f pattern adding circuit 75 into the frame from which the signaling information has been separated. The related data is subjected to an exchange processing at the exchange 17 and is then sent to the multiplexing apparatuses 18 connected to the output side (receiving side) thereof. In the multiplexing apparatus 18, frame synchronization is established by the frame synchronization circuit 76 to insert therein the signaling information and transmit the same to the transmission line 19. In this way, in the multiplexing apparatus 17, even if a delay time for the exchange processing in the exchange 17 varies for each call, it becomes possible to insert the signaling information only into the frame which is specified for the signaling. Thus, the same algorithm is adopted to the same frame, so that the deterioration of the voice quality and so on can be prevented. This has already been explained as the second mode of the embodiment.

Here, the signaling information is not allowed to be inserted into a modem signal such as facsimile data and the like. For this purpose, the modem detecting units 81 and 82 discriminate whether or not a voice signal is given. If a voice signal is given, synchronization by using the f pattern is established as mentioned before, and if the modem signal is given, an insertion of the f pattern is stopped and also detection of the f pattern at the frame synchronization circuit 76 is stopped to fix the synchronization phase, so that the modem signal is relayed and exchanged as it is.

Construction details will now further be explained. In FIG. 12, reference numerals 15 and 19 denote the aforesaid transmission lines, 171 denotes a network (NW) in the exchange 17, 172 denotes a central control apparatus (CC) and 77 denotes the aforesaid frame aligner circuit.

A voice signal is coded for band compression at, e.g., 32 Kbps and transmitted, via the transmission line 15, to the multiplexing apparatus 16. In the apparatus 16, the received voice signal is decoded to data of 64 Kbps by the decoder 22 and then applied to the f pattern adding circuit 75 and the modem detecting unit 81. Further, the signaling information S transmitted in the in-slot form is separated and input, in the out-slot form, to the network 171 in the exchange 17. This has already been explained.

The modem detecting unit 81 discriminates whether the received signal is a voice signal or modem signal such as facsimile data and the like. Since a voice signal is composed of the frequency components distributed in the voice frequency band, while a modem signal such as facsimile data and the like is composed of carrier frequency components, it is possible to discriminate the voice signal from the modem signal by detecting their respective frequency components.

The f pattern adding circuit 75 is operative to insert the f pattern in the frame in which the signaling information S has been inserted. For example, the f pattern is inserted in the LSB of the data obtained by decoding the frame from which the signaling information S has been separated. The resultant transmission information (data) D is input to the network 171 of the exchange 17.

The network 171 of the exchange 17 can be constructed with time switches (T) comprised of memories and space switches (S) comprised of switching transistors and so on, which are combined in a variety of forms, e.g., T-S, S-T-S, T-S-T and so on, in which exchanges of the time slots are performed under control of the central control apparatus 172. The signaling information S separated in the multiplexing apparatus 16 is transferred to the central control apparatus 172, and signaling information S for exchange control is given from the network 171 to the coder 23 in the multiplexing apparatus 18 under control of the central control apparatus 172.

The multiplexing apparatus 18 detects the f pattern by the frame synchronization circuit 76 added to the transmission information (data) D output from the exchange 17 to establish synchronization, so that the insertion phase for the 3-bit coding of the signaling information S by the coder 23, is determined by the frame aligner circuit 77. Namely, the 3-bit coding is applied to the frame containing the f pattern and this frame is added to the signaling information S at its LSB to be sent out to the transmission line 19.

When a modem signal such as facsimile data and so on is to be transmitted, the exchange 17 is put into a line hold state even if no signaling information S is present. In this case, if the modem detecting unit 81 of the multiplexing apparatus 16 detects a modem signal, it controls the f pattern adding circuit 75 so that insertion of the f pattern is stopped. On the other hand, the frame synchronization circuit 76 of the multiplexing apparatus 18 cannot detect the f pattern, and thus, it is considered that the synchronization is not established. However, when the modem detecting unit 82 detects the related modem signal, the f pattern detection at the frame synchronization circuit 76 is stopped so as to fix the frame phase in the frame aligner circuit 77. Accordingly, the modem signal is relayed and exchanged without adding, at its LSB, the signaling information S or the f pattern. This prevents deterioration of the transmission characteristics.

Note, in the aforementioned embodiment, a case is assumed where the signal is coded at 32 Kbps for the band compression, but the present invention is also applicable to a case where no such band compression is performed, i.e., the transmission rate is maintained at 64 Kbps. Further, the present invention is applicable to a case where the band compression is performed at a lower bit rate, such as 16 bps and so on.

An example of the voice/modem change-over type was explained above by referring to FIG. 12 which is based on the second mode of an embodiment of the present invention (FIG. 10), and below, a case will be explained where the voice/modem change-over type is adopted to the previous first mode of the embodiment (FIG. 3).

FIG. 14 is a view for explaining another embodiment of a voice/modem change-over type. Note the basic construction of the figure corresponds to the construction of the aforesaid FIG. 3.

For example, a modem signal transmission mode is detected by the use of an MR signal which is the result of modem signal detection processing (not limited to this) achieved in the coder 21 and the decoder 22. If the modem signal transmission mode is detected, control for establishing a phase synchronization with respect to the signaling information in the PCM signal is stopped, so as to minimize deterioration in coding quality which would occur if the mode was changed over to the modem signal transmission mode. In this case, if the transmission of the signaling information is just simply stopped, synchronization would not be established at a signaling phase synchronization circuit (corresponding to 91 in the figure) in the following stage. To solve this problem, a signaling phase synchronization circuit 91 is employed which is operative to stop the updating of a pull-in phase by using the MR signal resulting from the modem detection, and, in the modem signal transmission mode, position information of the signaling information which was detected in the voice signal transmission mode just before entering that mode is held, and if the modem signal mode is changed to the next voice signal transmission mode, a new signaling phase is used which is pulled in at a time following the guard time GT (see row (4) in FIG. 13), the guard time GT being needed for attaining synchronization pull-in. In this case, even if a change over from the voice signal transmission mode to the modem signal transmission occurs, when communication is fixed between one subscriber and another subscriber at all times, the route of line therebetween does not vary. Therefore, the route set up at the call origination is maintained as it is, and the phase of the signaling information at the initial voice signal transmission mode is maintained as it is. Thereby, even if a mode change occurs along the communication route, the original signaling phase can be restored at the same position which was regenerated by the phase synchronization. Thus, the chances of discontinuity occurring are reduced.

Note, in FIG. 14, reference numeral 51 represents the aforesaid demultiplexer for excluding the signaling information S according to the position information F regarding the signaling information S, and further, a signaling phase synchronization circuit 92 operates to inhibit transmission of the signaling information to the multiplexer unit 59 when the result signal MR produced by the modem signal detection is given from the coder 22.

FIG. 15 illustrates still another embodiment of a voice/modem change-over type, particularly including a specific example of the signaling phase synchronization circuit 91 of FIG. 14. Reference numeral 61 represents the pattern detecting unit of FIG. 7, which receives the received PCM signal as an input and detects the signaling position information F therefrom. If the information F is detected, the detection output is applied to a phase determination unit 102. If the information F is not detected, the phase determination unit 102 is not driven. Further the pattern detecting unit 61 is not driven if the MR signal is produced as a result of the modem signal detection, which indicates that the modem signal transmission mode is now present.

The phase determination unit 102 discriminates which phase for generating the information F is present, in terms of the sampling clock phase used in the unit 102. The result of the phase determination (several bits) is latched by a plurality of flip-flops 103, and at the same time, the Q outputs thereof corresponding to each of the bits, are sent to a selector (SEL) 104.

Each flip-flop 103 receives at its clock input a sampling clock CLK, but when the signal MR is generated indicating that the modem signal transmission mode is now present, each flip-flop 103 promptly stops receiving the clock CLK of the sampling rate. This stoppage is achieved by an AND gate (AND) 106. Namely, the flip-flops 103 hold the position information of the information S as it is obtained at the time when the voice signal transmission mode is changed to the modem signal transmission mode. The selector 104 selects one block of information which coincides with the phase (time slot) of the signaling information now held (the signaling information is inserted in the frame at the related timing) from among, for example, 8 kinds of signaling position information ($F_0$ to $F_7$) shifted in phase with each other, which signaling position information is produced by a signaling information phase generating circuit 105. The thus selected information is given to the coder 21 and also the decoder 22 in the in-slot form. Note, here, since a modem signal transmission mode is being presented, the phase signal from the selector 104 is not necessary. Further, since the AND gate (AND) 107 is also closed by the MR signal from the decoder 22, the signaling position information cannot reach the multiplexer unit 59 and thus it is not transmitted to the following stage. It should be understood that the multiplexer unit 59 also operates to multiplex the signaling position information F which is used for establishing the signaling phase synchronization.

FIG. 16 illustrates in more detail the pattern detecting unit 61 of FIG. 15 and also its neighboring members. A memory 111 periodically collects the LSB of each frame composing the received PCM signal, and the signaling information is stored sequentially. The signaling information is input to the pattern detecting unit 61 which carries out synchronization detection by a so-called immediate shifting operation with N ($\geq 2$) bits.

The pattern detecting unit 61 cooperates with a synchronization counter 112 so as to create the aforesaid guard time GT. Namely the phase determination unit 102 continues to hold the data as it is, since even if the synchronization pattern detection is restarted in the voice signal transmission mode (output "a"), the phase determination unit 102 is not given the detection output so long as the synchronization counter ends up counting a predetermined counting value. At this time, the MR signal disappears, and therefore, the AND gate 106 is opened, so that the flip-flops 103 are set with plural sets of signaling position information corresponding to respective bits, which signaling position information has sequentially been updated by the sampling clock CLK.

FIG. 17 represents, in the form of a timing chart, whole operations carried out in the constructions of FIGS. 15 and 16. In the figure, Row (1) depicts the result signal MR produced by the modem detection, which corresponds to row (1) in FIG. 13.

Row (2) depicts the output from the pattern detecting unit 61 of FIG. 15 and FIG. 16.

Row (3) depicts the aforesaid signaling information at each LSB.

Row (4) depicts the output from the phase determination unit 102 of FIG. 15 and FIG. 16. The output, i.e., the result by the determination, becomes indeterminate in the modem signal transmission mode, since the output from the pattern detecting unit 61 indicates non-detection in this mode.

Row (5) depicts a clock CLK (sampling clock) input to each flip-flop 103, and which is not supplied in the modem signal transmission mode.

Row (6) depicts a Q output from each flip-flop 103, which output indicates the signaling position information F.

Row (7) depicts the signaling position information F, which shows eight signals which are produced from the signaling information phase generating circuit 105 of FIG. 15 and are different in phase from each other.

Row (8) depicts an output from the selector (SEL) (see 104 in FIG. 15), which shows a case where the fifth phase signal, as an example, counted from the 0th phase signal, is specified by the flip-flop 103. Thus, if the mode returns to the voice signal transmission mode again, an extraction of the signaling information is achieved consistently with the fifth phase.

Row (9) depicts a hunting control which is inhibited in the modem transmission mode, but is restarted along with a restart of the voice signal transmission mode. Note, in the latter mode, the result of the hunting obtained after the guard time GT becomes effective.

FIG. 18 illustrates still another embodiment of a voice/modem change-over type. The related coding transmission apparatus 30 is comprised of, as mentioned previously, the coder 21 and the decoder 22. The coder 21 performs, similarly to that mentioned before, coding operations by using the optimum algorithms for a voice and for a modem, in accordance with the voice signal input and the modem signal input, respectively. The thus obtained coding signal is transmitted, when the signaling transmission is not performed, in the form of the ADPCM coding with n bits, and is transmitted, when the signaling transmission is performed, in the form of the ADPCM coding with (n−1) bits. The decoder 22 decodes the received signal, when the signaling transmission is performed, in the form of the ADPCM decoding with (n−1) bits, and decodes the same, when the signaling transmission is not performed, in the form of the ADPCM decoding with n bits.

Modem detecting units 82 and 81' and signaling period decision units 121 and 122, both newly employed in this embodiment, are mounted in the coding transmission apparatus 30 at the coder 21 side an the decoder 22 side as shown.

The modem detecting units 82 and 81' have functions, respectively, to detect whether the coder input and the decoder output are voice signals or modem signals.

The signaling period decision units 121 and 122 are operative to, according to the result signal MR produced by the voice or modem signal detection at the modem detecting units 82 and 81', select a short period or a long period for executing the (n−1) bit coding and decoding in the coder 21 and the decoder 22. In each of the embodiments shown in FIGS. 12 to 14, the insertion of the signaling information is inhibited if the modem signal is detected, but in the present embodiment, the related insertion of the same is carried out for a long period.

An explanation will be given below by assuming a case, similar to that described before, with the transmission line of 32 Kbps, in the usual mode where no signaling information transmission is performed, and the input signal composed of an 8-bit PCM signal is converted into the 4-bit ADPCM signal and then transmitted, and in the signaling mode where both the transmission information (data) D and the signaling information S are transmitted simultaneously, and the input signal is treated as a 7-bit PCM signal and then converted into the 3-bit ADPCM code to be transmitted. This transmission system corresponds to the one shown in FIG. 3.

At the coder 21 side, the result signal MR produced by the detection is output externally to indicate whether the input signal is a voice signal or a modem signal. The external circuit, if the result signal MR indicates a modem signal, makes a transmission period of the signaling information longer than the period in the voice signal transmission mode, and thus, the external circuit controls the coding quality in the modem signal transmission mode so that the signal quality is prevented from being deteriorated.

On the other hand, the decoder 22 detects whether or not the modem signal is given, as in the coder side, by the modem detecting unit 81', and it becomes possible, in synchronization with the coder side, to make a decoding period of the signaling information long.

Thus the transmission period of the signaling information is made longer during the modem signal transmission, and thereby, it becomes possible to prevent a deterioration of the coding quality, due to the transmission of the signaling information during the modem signal transmission.

FIG. 19 illustrates a more specific construction of FIG. 18. The major constituent elements are identical to those explained before. Members shown particularly in more detail are change-over switches 125, 126, short period signaling generation circuits 131, 132, and long period signaling generation circuits 141, 142.

Here, assuming that an input signal at the initial stage is irrelevant to the signaling, the input signal is composed of a μ-law (or A-law) PCM signal of 8 bits. This signal is input from the exchange (EX) to the code converter 41.

The signal converted into a linear PCM signal by the code converter 41 is input to the ADPCM coder 21 at the initial stage. The ADPCM coder 21 carries out an ADPCM coding processing with 3 bits if the signaling position information F given from the signaling period decision unit 121 is effective, and with 4 bits during a case other than the above, i.e., the usual mode. Similarly as mentioned before, the signaling position information F specifies a time slot, when the signaling information S is transmitted, at which the signaling information S is to be inserted, as a pattern, in the LSB of the ADPCM code.

The multiplexer unit 46 multiplexes both the ADPCM signal and the signaling information S which is given externally, and transmits same.

The demultiplexer unit 51 separates the thus transmitted multiplex signal and inputs it to the ADPCM decoder 22. The ADPCM decoder 22 generates a linear PCM signal by an ADPCM decoding processing with 3 bits, with the signaling information S separated by the demultiplexer unit 51, if the signaling position information F extracted by the phase synchronization circuit 76 is effective, and with 4 bits during a case other than the above, i.e., the usual mode. The code converter 58 converts the thus decoded linear PCM signal into a μ-law (or A-law) coded PCM signal, and transmits the same to the following stage. At the following stage, as in the initial stage, the coding and decoding processings are achieved with respect to the input signal with the number of bits determined by the signaling position information F. This has already been explained.

At the coder 21 side, the pattern detecting unit 61 always monitors the LSB of the received PCM signal to detect the signal phase at which the pattern indicating the signaling position information F is received. A result obtained by the detection is given to the signaling period decision circuit 121 so as to match with the detected signal phase. Then, at the related time slot, the 3-bit coding is achieved for the transmission of the signaling position information F, and signaling information S for the following stage is multiplexed therein to transmit the same to the following stage.

At the following stage, since the signaling position information is multiplexed in the received PCM signal, at its LSB, if the PCM code converter 41 at the input side converts the received signal as it is into the linear PCM signal, noise would be increased. To overcome this, the LSB is fixed at logic "0" or "1" before the conversion into the linear PCM signal and then converted into the linear PCM signal.

According to the result signal MR produced by a detection of the modem signal at the modem detecting units 82 and 81', the change-over switches 125 and 126 in the signaling period decision units 121 and 122 are controlled such that, when the modem signal is not detected, i.e., in the voice signal transmission mode, the short period signaling generation circuits 131 and 132 are selected to process a signaling transmission, while, when the modem signal is detected, i.e., in the modem signal transmission mode, the long period signaling generation circuits 141 and 142 are selected to process a signaling transmission. The signaling period in each of the long period signaling generation circuits 141 and 142 is selected to be longer than that of the short period signaling generation circuits 131 and 132, and the signaling transmission period during the modem signal transmission is made longer than that during the voice signal transmission.

FIG. 20 depicts a timing chart representing a change in a signaling period which corresponds to the previous FIG. 13. It is clear that, along with a change of the modem detection signal from the voice signal transmission mode to the modem signal transmission mode, the signaling period changes from a short period for the case in the voice mode to a long period for the case in the modem mode.

Thus, the signaling period in the modem mode is made longer. Regarding the modem signal, coding quality thereof is greatly deteriorated by an insertion of the signaling information therein due to its nature, however, since the signaling period is made longer in the modem mode as mentioned above, the deterioration in the coding quality during the modem signal transmission can be minimized. Accordingly, if the signaling transmission period is made as long as possible to an extent necessary for the process at the following stage, deterioration in a coding quality during the modem signal transmission can be minimized.

The modem detecting unit has briefly been explained, as its specific construction, in the description concerning FIG. 12 and will now be explained referring to FIG. 21.

FIG. 21 illustrates an example of a modem detecting unit. Note, the example is realized by utilizing the nature of a modem signal based on CCITT Recommendations V29. In FIG. 21, reference numerals 151 to 154 represent signal power calculation units, 155 denotes a band rejection filter, 156 and 157 denotes band filters and 158 denotes a comparison and determination unit. In a 9600 bps modem, the band rejection filter 155 is constructed such that the frequency bands of 500 Hz, 1700 Hz, and 2900 Hz are rejected, respectively, the band pass filter 156 works to allow the frequency band of 2900 Hz to pass therethrough, and the band pass filter works to allow the frequency band of 1700 Hz to pass therethrough.

The PCM signal is calculated regarding the power at the signal power calculation unit 151, and the power of the frequency band components other than the frequency bands rejected by the band rejection filter 155, is calculated at the signal power calculation unit 152, and further regarding the power of the frequency band components passed through the band pass filters 156 and 157, is calculated at the signal power calculation units 153 and 154, and the resultant output signals $S_0$, $R_0$, $W_2$, and $Y_0$, and an output signal Y from the band pass filter 157, are utilized to detect, at the comparison and determination unit 158, the beginning and end of communication by the modem signal.

Assuming that the output signals from the signal power calculation units 151 and 154 are $S_0$, as the received output signal, $R_0$, as the output signal through a frequency band rejection, $W_2$, as the received output signal of 2900 Hz and $Y_0$, as the received output signal of 1700 Hz, preparation for entering into the modem communication mode is achieved, ① if the received output signal $S_0$ is higher than the level when no signal is received and the output signal $R_0$ through the frequency band rejection is lower than a predetermined level, and also ② if it is detected that a term in which the level of the received output signal $W_2$ of 2900 Hz is about one third in level of the received output signal $S_0$, continues for a predetermined term; and then the modem communication is started when a phase inversion in a training signal between segments 2 and 3 is detected.

A finish of the modem communication is determined such that, first, a threshold level is set as the sum of a received level during a period of no signal reception in a segment 1 of the training signal plus some margin according to a predetermined ratio, and second, the threshold level is compared with a level of the received output signal $S_0$ after the start of the modem communication, and then the finish of the modem communication is determined by a condition where the level of the received output signal $S_0$ becomes lower than the threshold level.

As explained above, according to the present invention, in a relay and exchange system in which the signaling information is transmitted on each transmission line in an in-slot form together with transmission information (data), and is further transmitted via a plurality of exchanges connected in tandem, it is possible to prevent deterioration in voice quality from occurring on a transmission path from a transmitting side to a receiving side and also to prevent deterioration in the transmission characteristics of a facsimile signal.

The present invention may be applied to a digital data transmission network handling large amounts of data by adopting a high efficiency coding method.

We claim:

1. A relay and exchange system for time division multiplex data, comprising:

first and second exchanges;

at least one transmission line; and a plurality of multiplexing apparatuses including a first multiplexing apparatus coupled between the at least one transmission line and the first exchange and a second multiplexing apparatus coupled between the at least one transmission line and the second exchange, each of said first and second multiplexing apparatuses being constructed such that an ADPCM coding signal input from said at least one transmission line is converted into a linear PCM signal to be input to a respective one of said first and second exchanges, while a linear PCM signal from the respective one of the first and second exchanges is converted into the ADPCM code signal and output to said at least one transmission line, in which relay and exchange system signaling information is transmitted between the first and second multiplexing apparatuses, each of the first and second multiplexing apparatuses including means for detecting the PCM signal input from one of the first and second exchanges and the signaling information of the ADPCM code input from said at least one transmission line, and means for inserting, if the signaling information is detected, new signaling information for the other of said first and second exchanges, into a position in which the signaling information detected by the means for detecting was contained to perform coding and decoding operations.

2. A relay and exchange system for time division multiplex data, comprising:

a plurality of exchanges each performing relay and exchange operations of transmission information such as a voice signal or a facsimile signal;

a plurality of transmission lines for connecting the plurality of exchanges in tandem;

a plurality of output side multiplexing apparatuses, each connected to each of said plurality of exchanges at an output side thereof and connected to each of said transmission lines at one end, and including a coder for performing a code conversion from m bits or (m−1) bits to n (m>n) bits or (n−1) bits, respectively; and a plurality of input side multiplexing apparatuses, each connected to each of said plurality of exchanges at an input side thereof and connected to each of said transmission lines at the other end, and including a decoder for performing a code conversion from n bits or (n−1) bits to m bits or (m−1) bits, respectively, said transmission information being transmitted in a usual mode in a multiframe in which each frame is transmitted on each of said plurality of transmission lines, with n bits, while each frame is transmitted at the input side and the output side of each of said plurality of exchanges, with m bits, said transmission information being transmitted in a signaling mode where signaling information used for controlling an exchange processing of said transmission information is inserted cyclicly in one frame in said multiframe and is transmitted by frames each composed of (n−1) bits on each of said plurality of transmission lines, and said signaling information of one bit is transmitted by the related frame in an in-slot form, while the transmission information is transmitted, at the input side and the output side of each of said exchanges, by (m−1) bits and the signaling information is transmitted in an out-slot form, said relay and exchange system further comprising:

operational mode determining means coupled to each coder, for making the coder operate in the signaling mode if the signaling information is detected, and for making the coder operate in the usual mode if the signaling information is not detected; and signaling information inserting means coupled to each decoder, for making the decoder operate in the signaling mode if the signaling information is received and detected and for inserting new signaling information, to be given to a following one of the plurality of exchanges, in a LSB of the related frame of m bits and for sending the related frame of m bits.

3. A relay and exchange system as set forth in claim 2, wherein:

signaling position information is further contained in the signaling information obtained, in every signaling mode, by extraction from one frame among each of said multiframe, the extraction being performed by said operational mode determining means, which signaling position information indicates that the signaling information is located at a related frame position, and each of said plurality of input side multiplexing apparatuses and each of said plurality of output side multiplexing apparatuses includes insertion means for inserting said signaling position information, and detection means for detecting the signaling position information.

4. A relay and exchange system as set forth in claim 3, wherein:

each of said coders includes a code converter, at an input stage of the coder, for converting a μ-law or A-law coded signal into a linear code signal, a switch, at a middle stage of the coder, for selecting either one of a reverse quantizer of n bits and a reverse quantizer of (n−1) bits, and a multiplexer unit, at an output stage of the coder, for inserting said signaling information, wherein:

according to said signaling position information, said code converter is switched from the code conversion of m bits to the code conversion of (m−1) bits, said switch selects said reverse quantizer of (n−1) bits and said multiplexer unit executes said insertion of said signaling information, each of said decoders includes a demultiplexer unit, at an input stage of the decoder, for extracting said signaling position information, a switch at a middle stage of the decoder, for selecting either one of a reverse quantizer of n bits and a reverse quantizer of (n−1) bits, a code converter for converting the linear code signal into the μ-law or A-law coded signal, and a multiplexer unit for inserting said new signaling information, and according to the thus demultiplexed signaling information, said switch selects said reverse quantizer of (n−1) bits, said code converter is switched from the code conversion of m bits to the code conversion of (m−1) bits, and said multiplexer unit executes said insertion of said signaling information.

5. A relay and exchange system as set forth in claim 4, wherein:

said operational mode determining means is mounted at an input side of said code converter in said coder and includes a pattern detecting unit receiving a received signal of m bits given from a preceding one of the plurality of stages, and a logic gate unit coupled to the pattern detecting unit, said pattern detecting unit is operative to find said signaling position information by detecting, from said received signal of m bits, a pattern indicating said signaling position information, and to supply mask data to said logic gate unit so as to fix only the LSB of the related frame at logic "1" or "0", and said logic unit supplies said transmission information to said code converter, the transmission information containing a frame which has an LSB fixed at logic "1" or "0".

6. A relay and exchange system as set forth in claim 4, wherein:

said signaling information inserting means includes a logic gate unit disposed between said code converter included within the decoder and said multiplexer unit included within the decoder, said logic gate unit is operative, when receiving said demultiplexer signaling position information, to fix only an LSB of an m-bit output signal from said code converter included within the decoder at logic "1" or "0", which signal is then inserted with said new signaling information at said multiplexer unit included within the decoder.

7. A relay and exchange system as set forth in claim 3, wherein:

each of said plurality of input side multiplexing apparatuses includes identifying information insertion means for inserting identifying information into a particular frame selected from said frames each composed of m bits, which particular frame corresponds to a frame position which has been contained in said signaling information in said frames each composed of n bits and each having been transmitted on said transmission line in said in-slot form, each of said plurality of output side multiplexing apparatuses includes a synchronization detecting unit for detecting a frame from frames each composed of m bits given after relay and exchange through one of said plurality of exchanges, in which identifying information is inserted, and said coding means is coupled to the synchronization detecting unit, for inserting said signaling information in synchronization with the frame from frames each composed of m bits detected by the synchronization detecting unit.

8. A relay and exchange system as set forth in claim 7, wherein:

said identifying information insertion means includes a pattern adding circuit which operates to add a pattern for identifying the signaling, and the pattern adding circuit operates, together with the decoder associated therewith, in synchronization with the internal timing defined in said input side multiplexing apparatus.

9. A relay and exchange system as set forth in claim 8, wherein said synchronization detecting unit includes a frame synchronization circuit for establishing synchronization of the frames of m bits by detecting said pattern for identifying the signaling.

10. A relay and exchange system as set forth in claim 7, wherein:
each coding means includes said coder of each of said plurality of output side multiplexing apparatuses, and
a frame aligner circuit coupled to the coder, and
the frame aligner circuit is operative, when said frame synchronization circuit detects said pattern for identifying the signaling, to make a frame phase of said multiframe coincide with a detection phase of the pattern and to supply the frames thus matched in phase to said coder.

11. A relay and exchange system as set forth in claim 10, wherein said frame aligner circuit operates, together with said coder, in synchronization with the internal timing defined in each corresponding one of said plurality of output side multiplexing apparatuses.

12. A relay and exchange system as set forth in claim 9, wherein said pattern for identifying the signaling is composed of an alternating pattern of logic "1" and "0" changed every time said particular frame occurs.

13. A relay and exchange system as set forth in claim 8, wherein a ratio between an insertion period in which said pattern for identifying the signaling is inserted in said particular frame of said multiframe and an insertion period of said signaling position information, is set as P:1 where P denotes a predetermined positive integer.

14. A relay and exchange system as set forth in claim 3, wherein:
each of said plurality of output side multiplexing apparatuses includes
first mode detecting means for detecting a mode in which a modem signal, other than said voice signal, and such as said facsimile signal, is to be transmitted, and
when said first modem detecting means detects that said transmission information is the modem signal, the insertion of said signaling position information, in each of said plurality of output side multiplexing apparatuses, into said particular frame is stopped so that information other than said signaling position information, is supplied to a corresponding one of said plurality of input side multiplexing apparatuses, which information is indicative of a synchronization phase of said particular frame by which the synchronization just before has been detected, so as to virtually maintain frame phase synchronization.

15. A relay and exchange system as set forth in claim 14, wherein:
each of said plurality of output side multiplexing apparatuses further includes
a signaling information phase generating circuit which simultaneously produces m kinds of synchronization phase information different in phase from each other, and
a phase determination unit for determining a phase of said signaling information at a time when said modem signal is detected, and
one of the outputs from said signaling information phase generating circuit is selected which corresponds to the phase determined by said phase determination unit.

16. A relay and exchange system as set forth in claim 15, wherein:
each of said plurality of input side multiplexing apparatuses which is coupled with a corresponding one of said plurality of output side multiplexing apparatuses includes
second modem detecting means for detecting the mode of the modem signal, other than said voice signal, and such as said facsimile signal, which is to be received from the corresponding one of said plurality of output side multiplexing apparatuses, and
when a change is detected in said transmission information in which a transition occurs from said modem signal to said voice signal, and after a lapse of a predetermined guard time from the change, the phase synchronization of said particular frame is effected based on the detection of the signaling position information.

17. A relay and exchange system as set forth in claim 7, wherein:
each of said plurality of input side multiplexing apparatuses includes a first modem detecting unit for detecting a mode in which a modem signal, other than said voice signal, and such as said facsimile signal, is to be transmitted,
when said modem detecting unit detects that said transmission information is the modem signal, the insertion of said signaling position information or said identifying information, in each of said plurality of input side multiplexing apparatuses, into said particular frame is stopped,
each of said plurality of output side multiplexing apparatuses includes a second modem detecting unit for detecting the mode of the modem signal, other than the voice signal, and such as the facsimile signal, is to be received from a corresponding one of said plurality of input side multiplexing apparatuses, and
when said modem detecting unit detects that said transmission information is the modem signal, the detection of said signaling position information or said identifying information in each of said plurality of output side multiplexing apparatuses is stopped and a synchronization phase of said particular frame by which the synchronization just before was detected, is fixed.

18. A relay and exchange system as set forth in claim 3, wherein each of said plurality of output side multiplexing apparatuses includes
a first modem detecting unit which detects a mode in which a modem signal, other than said voice signal, and such as said facsimile signal, is to be transmitted,
a first signaling period decision unit coupled to the first modem detecting unit, which is controlled by said first modem detecting unit and decides a first signaling transmission period in which said signaling information is to be inserted cyclically into one frame in said multiframe at a first timing based on said signaling position information transferred from a preceding one of the plurality of stages, and
said signaling period decision unit is operative to set a long insertion period or short insertion period, respectively, of said signaling information in accordance with whether or not said modem signal is detected.

19. A relay and exchange system as set forth in claim 18, wherein said signaling period decision unit includes
a short period signaling generation circuit for setting a short signaling transmission period,
a long period signaling generation circuit for setting a long signaling transmission period, and
a change-over switch for selecting one of the outputs from the short period signaling generation circuit and the long period generation circuit in accordance with a result of detection produced by said first modem detecting unit.

20. A relay and exchange system as set forth in claim 18, wherein each of said plurality of input side multiplexing apparatuses further includes
a second modem detecting unit which detects a mode in which the modem signal, other than said voice signal, and such as said facsimile signal, is to be received, and
a second signaling period decision unit coupled to the second modem detecting unit, which is controlled by said second modem detecting unit and which decides a second signaling transmission period in which said signaling information is to be inserted cyclically into one frame in said multiframe at a second timing based on said signaling position information transferred from a preceding one of the plurality of stages, and
said second signaling period decision unit is operative to set a long insertion period or short insertion period, respectively, of said signaling information in accordance with whether or not said modem signal is detected.

21. A relay and exchange system as set forth in claim 20, wherein each of said first and second signaling period decision units includes
a short period signaling generation circuit for setting a short signaling transmission period,
a long period signaling generation circuit for setting a long signaling transmission period, and
a change-over switch for selecting one of the outputs from the short period signaling generation circuit and the long period generation circuit in accordance with a result of detection produced by respective ones of said first and second modem detecting units.

22. A relay and exchange system for time division multiplex data, supplied with a first ADPCM signal, comprising:
a first multiplexing apparatus for receiving the first ADPCM signal, for detecting first signaling information included within the first ADPCM signal, and for converting the first ADPCM signal of n bits or less than n bits into a first PCM signal of m (m>n) or less than m bits, respectively, the first ADPCM signal and the first PCM signal being less than n bits and less than m bits, respectively, when the first signaling information is present, and for inserting second signaling information into the first PCM signal;
an exchange coupled to said first multiplexing apparatus, for exchanging the first PCM signal based on the first signaling information to generate a second PCM signal; and
a second multiplexing apparatus coupled to said exchange, for receiving the second PCM signal, for detecting second signaling information included within the second PCM signal, and for converting the second PCM signal of m or less than m bits into a second ADPCM signal of n bits or less than n bits, respectively, the second PCM signal being less than m bits and the second ADPCM signal being less than n bits when the second signaling information is detected.

23. A method for relaying and exchanging a first ADPCM signal, comprising the steps of:
a) detecting whether first signaling information is included within the first ADPCM signal;
b) converting the first ADPCM signal of n bits or less than n bits into a first PCM signal of m(m>n) or less than m bits, respectively, the first ADPCM signal being less than n bits and the first PCM signal being less than m bits when the first signaling information is detected in said step (a);
c) inserting second signaling information into the first PCM signal;
d) exchanging the first PCM signal based on the second signaling information;
e) detecting the second signaling information included within the second PCM signal; and
f) converting the second PCM signal of m or less than m bits to a second ADPCM signal of n bits or less than n bits, the second PCM signal being less than m bits and the second ADPCM signal being less than n bits when the second signaling information is detected in said step (e).

* * * * *

UNITED STATES PATENT AND TRADEMARK OFFICE
CERTIFICATE OF CORRECTION

PATENT NO. : 5,291,484
DATED : March 1, 1994
INVENTOR(S) : Yoshihiro TOMITA et al.

It is certified that error appears in the above-indentified patent and that said Letters Patent is hereby corrected as shown below:

Column 1, line 28, change "APCM" to --ADPCM--.

Column 2, line 27, after "Brief Description"

insert --of the Drawings--.

Column 4, line 47, change "where" to --in which--, and after "in" insert --the--;

line 47, delete "the" (first occurrence only).

Column 5, line 13, delete "one";

line 45, delete "a".

Column 6, line 14, change "(22)" to --(21)--.

Column 8, line 12, change "SO" to --50--.

UNITED STATES PATENT AND TRADEMARK OFFICE
CERTIFICATE OF CORRECTION

PATENT NO. : 5,291,484
DATED : March 1, 1994
INVENTOR(S) : Yoshihiro TOMITA et al.

It is certified that error appears in the above-indentified patent and that said Letters Patent is hereby corrected as shown below:

Column 9, line 2, after "while" delete --L--.

Column 13, line 12, change "isertion" to --insertion--.

Column 16, line 22, delete "just".

Column 21, line 10, change "denotes" to --denote--.

Signed and Sealed this

Ninth Day of August, 1994

Attest:

BRUCE LEHMAN

Attesting Officer

Commissioner of Patents and Trademarks